United States Patent
Negishi et al.

[11] Patent Number: 6,005,590
[45] Date of Patent: Dec. 21, 1999

[54] GEOMETRICAL OPERATION APPARATUS FOR PERFORMING HIGH SPEED CALCULATIONS IN A THREE-DIMENSIONAL COMPUTER GRAPHIC DISPLAY SYSTEM

[75] Inventors: Hiroyasu Negishi; Masatoshi Kameyama; Yoshitsugu Inoue; Hiroyuki Kawai, all of Tokyo, Japan

[73] Assignee: Mitsubishi Denki Kabushiki Kaisha, Tokyo, Japan

[21] Appl. No.: 08/743,178

[22] Filed: Nov. 5, 1996

[30] Foreign Application Priority Data

Mar. 27, 1996 [JP] Japan .................................. 8-072464

[51] Int. Cl.[6] .................................................. G06F 15/16
[52] U.S. Cl. .................... 345/505; 345/513; 345/514; 345/508; 345/434; 345/515; 712/234; 712/236
[58] Field of Search ...................................... 345/502, 505, 345/522, 434, 523, 513, 197, 198, 516; 395/580, 564, 583, 581; 712/233, 223, 234, 236

[56] References Cited

U.S. PATENT DOCUMENTS

| | | | |
|---|---|---|---|
| 4,912,659 | 3/1990 | Liang .................................. | 345/434 |
| 5,315,700 | 5/1994 | Johnston et al. .................. | 345/502 |
| 5,388,236 | 2/1995 | Murakami et al. ................ | 395/583 |
| 5,500,939 | 3/1996 | Kurihara ............................ | 345/502 |
| 5,715,440 | 2/1998 | Ohmura et al. .................... | 395/580 |
| 5,720,019 | 2/1998 | Koss et al. ........................ | 345/434 |
| 5,721,883 | 2/1998 | Katsuo et al. .................... | 345/505 |
| 5,872,965 | 2/1999 | Petrick .............................. | 395/583 |

FOREIGN PATENT DOCUMENTS

| | | |
|---|---|---|
| 314335 | 5/1989 | European Pat. Off. . |
| 396517 | 11/1990 | European Pat. Off. . |
| 63-086079 | 4/1988 | Japan . |
| 64034 | 3/1989 | Japan . |
| 1264 | 1/1991 | Japan . |
| 2223335 | 4/1990 | United Kingdom . |
| 2293671A | 4/1996 | United Kingdom . |

*Primary Examiner*—Kee M. Tung
*Assistant Examiner*—Sy D. Luu
*Attorney, Agent, or Firm*—Burns, Doane, Swecker & Mathis, LLP

[57] ABSTRACT

The apparatus comprises an input memory 102 for storing data necessary for geometrical operations, such as coordinate transformation, luminance calculation, and clipping operation of graphics; a global bus connected to the input memory; a plurality of floating process memories connected to the global bus, for receiving data necessary for geometrical operations; a sequencer for transmitting data necessary for geometrical operations, stored in the input memory, to the plurality of floating process memories; and a plurality of floating processing units each connected to a respective one of the plurality of floating process memories, for independently executing geometrical operations, using data transmitted from the floating process memories.

10 Claims, 28 Drawing Sheets

Z > ZMAX

|  | XMIN | XMAX |  |
|---|---|---|---|
| SPACE11 010110 | SPACE12 010100 | SPACE13 010101 |  |
| SPACE14 010010 | SPACE15 010000 | SPACE16 010001 | YMAX |
| SPACE17 011010 | SPACE18 011000 | SPACE19 011001 | YMIN |

ZMAX > Z > ZMIN

|  | XMIN | XMAX |  |
|---|---|---|---|
| 000110 | 000100 | 000101 |  |
| 000010 | 000000 | 000001 | YMAX |
| 001010 | 001000 | 001001 | YMIN |

ZMIN > Z

|  | XMIN | XMAX |  |
|---|---|---|---|
| 100110 | 100100 | 100101 |  |
| 100010 | 100000 | 100001 | YMAX |
| 101010 | 101000 | 101001 | YMIN |

011010
- 0TH BIT (XMAX)
- 1ST BIT (XMIN)
- 2ND BIT (YMAX)
- 3RD BIT (YMIN)
- 4TH BIT (ZMAX)
- 5TH BIT (ZMIN)

| INSTRUC-TION | SOURCE FIELD | SOURCE ADDRESS | DESTINATION FIELD | DESTINATION ADDRESS |

Fig. 18

| FIELD CODE | TRANSMISSION SOURCE/ DESTINATION |
|---|---|
| 000 | INNER REGISTER |
| 001 | ILM |
| 011 | MULTICAST FLM |
| 100 | FLM1 |
| 101 | FLM2 |
| 110 | FLM3 |
| 111 | FLM4 |

Fig. 19

| NO | FPP1 | FPP2 | FPP3 | FPP4 |
|----|------|------|------|------|
| 1 | T11*X | T21*Y | T31*Z | T41*W |
| 2 | T11*X+T21*Y | | T31*Z+T41*W | |
| 3 | T11*X+T21*Y+<br>T31*Z+T41*W | | | |
| 4 | T12*X | T22*Y | T32*Z | T42*W |
| 5 | T12*X+T22*Y | | T32*Z+T42*W | |
| 6 | | T12*X+T22*Y+<br>T32*Z+T42*W | | |
| 7 | T13*X | T23*Y | T33*Z | T43*W |
| 8 | T13*X+T23*Y | | T33*Z+T43*W | |
| 9 | | | T13*X+T23*Y+<br>T33*Z+T43*W | |
| 10 | T14*X | T24*Y | T34*Z | T44*W |
| 11 | T14*X+T24*Y | | T34*Z+T44*W | |
| 12 | | | | T14*X+T24*Y+<br>T34*Z+T44*W |

Fig. 26 PRIOR ART

GEOMETRICAL OPERATION APPARATUS FOR PERFORMING HIGH SPEED CALCULATIONS IN A THREE-DIMENSIONAL COMPUTER GRAPHIC DISPLAY SYSTEM

BACKGROUND OF THE INVENTION

1. Field of the Invention

The present invention relates to an apparatus which performs a geometrical operation, such as coordinate transformation, luminance calculation, or a clipping operation, at a high speed in a three-dimensional computer graphic display system.

2. Description of the Prior Art

[Prior Art 1]

FIG. 24 illustrates a three-dimensional (3-D) image generation apparatus disclosed in JP Laid-Open No. Sho 63-86079. This apparatus employs a conventional parallel processor arrangement in which a large number of 3-D vector operations and matrix operations are performed for 3-D graphic image generation at a high speed through parallel execution. FIG. 24 shows the following components: an interface IF between the device and a system bus 10; data memories DBMs1-4 for storing data regarding object form and parameters to be used for image generation; floating processing units FPUs1-3; an arithmetic logic unit FALU; a high speed data bus 20 for connecting the DBMs1-4, the FPUs1-3, and the unit FALU; a data collector DC for collecting image data generated by the processing units, so as to write them into a display memory; a program memory WCS for storing an instruction for controlling respective processing units, memories, and logical circuits; a sequencer SEQ for reading out an instruction from the WCS; and an address generator ADG for generating a physical address for the DBM based on a memory address designation instruction among all the instructions read out by the SEQ from the WCS.

FIG. 25 is a detailed representation showing an example combining the FPUs1-3 and the FALU in FIG. 24. FIG. 25 includes the following components: floating point processors FPPs1-4; an arithmetic logic unit ALU; a multiplexer MPX for selecting one from a plurality of data; registers REGs1-4 for storing operation data; and a reference table LUT for storing parameters for computing various functions, such as roots, trigonometric functions etc., at a high speed. As shown in the drawing, the respective FPPs are connected to one another via MPXs such that an output of one FPP can become an input of the other FPPs. Such a connection of four individually operative FPPs1-4 will allow parallel execution of four separate operations.

FIG. 26 shows steps of a matrix calculation for coordinate transformation, using parallel processors shown in FIG. 25. The expression (1) (described later) comprises matrix components T11, T12, T13, T14, T21, T22, T23, T24, T31, T32, T33, T34, T41, T42, T43, and T44. When it is assumed that data on the first, second, third and fourth four components above are pre-stored in FPP1, FPP2, FPP3, and FPP4, respectively, solving the expression (1) requires sixteen multiplications and twelve additions to be conducted because three additions per line must be conducted for four lines. However, with the use of these parallel processors, the expression (1) can be solved through twelve steps by the FPPs1-4. Nevertheless, it is further desirable if the operation is achieved at a higher speed.

$$\begin{pmatrix} X' \\ Y' \\ Z' \\ W' \end{pmatrix} = \begin{pmatrix} T11 & T12 & T13 & T14 \\ T21 & T22 & T23 & T24 \\ T31 & T32 & T33 & T34 \\ T41 & T42 & T43 & T44 \end{pmatrix} \begin{pmatrix} X \\ Y \\ Z \\ W \end{pmatrix} \quad (1)$$

In this system, although the four parallel processors can operate simultaneously in coordinate transformation, some processors are left idle in some steps, as shown in FIG. 26. For 3-D graphic processing in which a large amount of computation is conducted on a real time basis, it is necessary to enhance the parallel extent of the parallel operations of the processors so as to reduce operational time.

[Prior Art 2]

FIG. 27 is a block diagram showing another prior art, or a sequence control apparatus disclosed in JP Laid-Open No. Sho 64-64034. This prior art apparatus includes sequence circuit hardware which can judge whether or not input information has a particular pattern. FIG. 27 includes the following components: flip flops 2701-1 to 2701-N for holding N bit data, each bit indicating each of N input conditions; an input data generation circuit 2702 for generating N-bit parallel data, using the N outputs of the flip flops 2701-1 to 2701-N; an instruction register 2704-1 for storing an instruction code; a comparison circuit 2703 for comparing the N-bit data from the input data generation circuit 2702 and N-bit data held in the second field (2704-1a) of the instruction register 2704-1, so as to output a matching signal when these data match; a decoder 2704-2 for decoding a condition branch instruction held in the first field of the instruction register 2704-1, so as to output an execution signal; a logical AND circuit 2705 for outputting a logical AND of the matching signal from the comparison circuit 2703 and the execution signal from the decoder 2704-2; branch destination selection circuit 2706 for outputting a branch destination of the condition branch instruction, when receiving a signal from the logical AND circuit 2705; and a program counter 2704-3 for holding the branch destination address when receiving a signal from the branch destination selection circuit 2706.

The operation of this sequence circuit will now be described. When it is assumed that N is eight, the flip flops 2701-1 to 2701-8 hold 8-bit input information, so that the input data generation circuit 2702 generates 8 bit data, based on this information. Provided that the second field of the instruction register 2704-1 contains data "00000011," the comparison circuit 2703 outputs a matching signal when data held in the flip flops 2701-1 to 2701-8 is "00000011." Meanwhile, a decoder 2704-2 decodes an instruction code of a condition branch instruction held in the first field of the instruction registers 2704-01, and outputs decoded data as an execution signal. The logical AND circuit 2705 computes a logical AND of the matching and execution signals, and outputs the result as an output signal. Based on this output signal, the branch destination selection circuit 2706 outputs a branch destination address held in the third field of the instruction register 2704-1, as a branch destination signal, which corresponds to a start address of a certain operation. The program counter 2704-3 holds the address output by the branch destination selection circuit 2706, and the system starts execution of a program at the address held in the program counter 2704-3.

In the branch sequence of this prior art, the operational process is branched only when a bit pattern matches a predetermined single branch condition. Thus, in the case of a plurality of branch conditions and bit patterns, it is necessary to compare respective patterns with every branch condition, which impedes a high speed branch operation.

[Prior Art 3]

A third prior art is described referring to FIG. 28, which relates to a multicast transmission for use in a multiprocessor arrangement disclosed in JP Laid-Open No. Hei 3-1264. This drawing includes a main processor 2801 and I/O processors 2802, each operable independently. In this arrangement, when one of the I/O processors 2802 issues address data into a bus, all the other I/O processors 2802 individually monitor the data to see whether the data is addressed thereto, and reads the necessary data. In this method, a multicast transmission is performed by sending data from one source, which addresses more than two destinations.

Generally speaking, in a conventional clipping operation, a clip code generation circuit generates clip codes for plates in the X, Y, and Z directions one by one, to execute a clip judgment of a polygon. As a result, clip judgement takes time to complete, which hinders high speed image drawing.

In this prior art, the respective parallel processors must detect whether data is addressed to themselves, which makes the hardware rather complicated. Further, when one processor transmits data to all the other processors in a conventional SIMD format parallel processor structure, destination processors must be designated one by one, which takes a long transmission time.

SUMMARY OF THE INVENTION

A first aspect of the prevent invention aims to enhance a parallel extent of parallel operations to eliminate idle time of processors, so that coordinate transformation and vector calculations for 3-D graphics can be carried out at a high speed.

According to the first aspect of the invention, there is provided a geometrical operation apparatus, comprising: an input memory for storing data necessary for various geometrical operations; a global bus connected to the input memory; a plurality of floating process memories connected to the global bus, to which the data necessary for various geometrical operations are transmitted; a sequencer for transmitting the data stored in the input memory to the plurality of floating process memories; and a plurality of floating processing units each connected to a respective one of the plurality of floating process memories, for independently performing various geometrical operations using the data transmitted to the floating process memories.

According to this aspect, a geometrical operation can be achieved at a high speed through an enhanced parallel extent of parallel operations.

A second aspect of the present invention aims to make simultaneous clip judgement for X, Y, Z and W coordinates for a high speed clip judgment.

According to this aspect of the invention, there is provided a geometrical operation apparatus, further comprising: a plurality of shift registers each connected to a respective one of the plurality of floating processing units, for storing a clip code in a shiftable way, the clip code being produced as a result of a clipping operation by the corresponding floating processing unit; a clip state code generator for generating a clip state code indicating a state of an object consisting of a plurality of vertices, using clip codes stored in the plurality of shift registers; and a clip code register for storing the clip code shifted by the plurality of shift registers and a clip state code generated by the clip state code generator.

A third aspect of the present invention aims to perform a multicast transmission for transmitting data from one source to a plurality of destinations simultaneously, without increasing circuit complexity.

According to this aspect of the invention, there is provided a geometrical operation apparatus, wherein the sequencer conducts data transmission between the plurality of floating process memories, using a transmission instruction, the transmission instruction including a source field for indicating a source of the data transmission, a destination field for indicating a destination of the data transmission, and a bit field provided to the source field and the destination field, for indicating any or all the plurality of floating process memories.

According to this aspect, a high speed multicast transmission can be realized between processors capable of parallel operations.

A fourth aspect of the invention aims to simultaneously judge a plurality of branch conditions for a high speed condition branch.

According to this aspect, there is provided a geometrical operation apparatus, comprising: a target register for storing a present true/false state of conditions, which is referred to when performing a branch operation in a geometrical operation; a plurality of reference registers each for storing predetermined true/false state of the conditions; an address table for holding addresses of process programs each corresponding to a respective one of the plurality of the reference registers; a comparator for comparing the target register with each of the plurality of reference registers, so as to output a comparison result; and a program counter controller for executing a process program having the address identified in the address table, on the basis of the comparison result.

BRIEF DESCRIPTION OF THE DRAWINGS

The above and the other objects, features and advantages will be further apparent from the following description of the preferred embodiment taken in conjunction with the accompanying drawings wherein:

FIG. 18 is an instruction format of a transmission instruction shown in the eighth preferred embodiment;

FIG. 19 is an example of a field code shown in the eighth preferred embodiment;

FIG. 26 is a step chart for a coordinate transformation operation by a conventional 3-D image generation apparatus;

DESCRIPTION OF THE PREFERRED EMBODIMENTS

[Embodiment 1]

Figure 1:
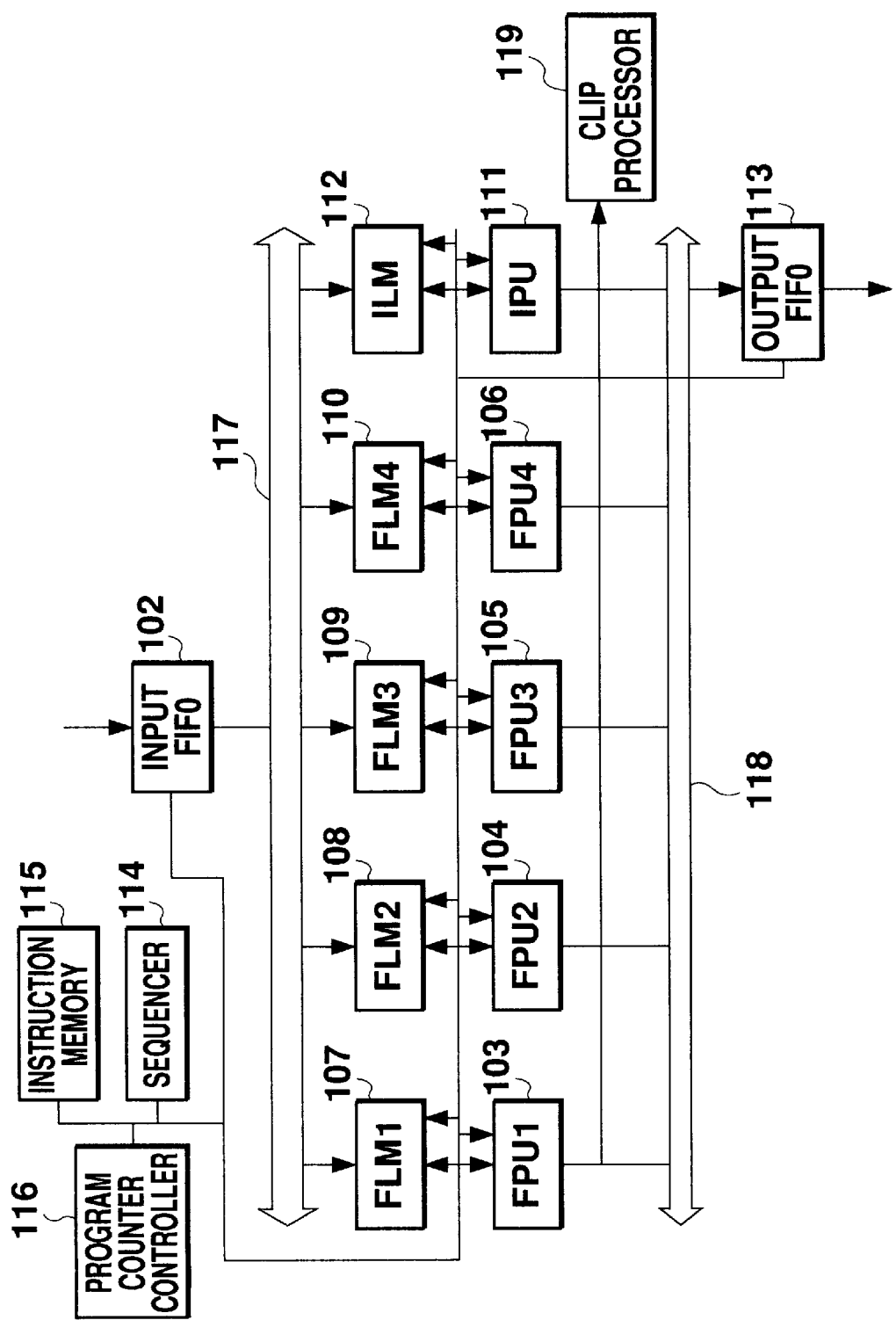
FIG. 1 is a block diagram showing a geometrical operation apparatus according to a first embodiment of the present invention.

In the following, a first preferred embodiment of the present invention is described. FIG. 1 is a block diagram which shows a construction of a geometrical operation apparatus of this embodiment. The apparatus comprises four floating processing units, four local memories connected to the floating processing units, one integer type processing unit, and one local memory connected to the integer type processing unit.

FIG. 1 includes an input FIFO 102 for holding data from a host processor (not shown), and floating processing units FPU1-103, FPU2-104, FPU3-105 and FPU4-106 for executing logical AND operations etc., which are used in coordinate transformation and luminance calculation etc.

Local memories 107, 108, 109, and 110 are connected to the floating processing units FPU1-103, FPU2-104, FPU3-105, and FPU4-106, respectively, and each serves as a floating process memory FLM1, FLM2, FLM3, and FLM4 for holding data and parameters necessary for operations.

An integer type processing unit IPU 111 executes general integer operations. A local memory ILM 112, connected to the integer type processing unit IPU 111, stores data and parameters necessary for the operation. An output FIFO 113 holds output data from FPU1-103, FPU2-104, FPU3-105, FPU4-106, and IPU-111.

An instruction memory 115 holds an instruction program which instructs the operation of a sequencer 114. A program counter controller 116 sets an address to which a program is branched in a program counter. FLM1-107, FLM2-108, FLM3-109, FLM4-110 and ILM 112 are connected to the input FIFO 102 via a global bus 117. FPU1-103, FPU2-104, FPU3-105, FPU4-106 and IPU-111 are connected to the output FIFO-113 via an output bus 118. A clip process section (clip processes) 119 generates a clip flag for use in a clipping operation based on the Cohen-Sutherland method.

The sequencer 114 controls the following based on the instruction program: the operation by FPU1-103, FPU2-104, FPU3-105, FPU4-106 and IPU-111; read/write operations of FLM1-107, FLM2-108, FLM3-109, FLM4-110 and ILM-112; read operation of the input FIFO 102; write operations of the output FIFO 113; the operation of the program counter controller 116 for generating and holding an address of the instruction program read from the instruction memory 115; and the operation of the clip process section 119.

The operation will next be described referring to FIG. 1.

In order to generate a 3-D graphic image, it is necessary to generate data regarding colors and coordinates of an object when it is displayed on a display, through computation based on the data regarding coordinates, normal lines, color attributes of the object to be drawn and a light source flashing over the object.

A host computer (not shown) supplies these data via the input FIFO 102 to the geometrical operation apparatus. The sequencer 114 transmits the supplied data from the input FIFO 102 to one or more of the FLM1-107, FLM2-108, FLM3-109, FLM4-110, and ILM-112 according to an instruction in the instruction memory 115. When the sequencer 114 instructs FPU1-103, FPU2-104, FPU3-105, and FPU4-106 to execute operations, the respective FPUs retrieve data necessary for the operation from FLM1-107, FLM2-108, FLM3-109, FLM4-110, and ILM-112 connected thereto.

Figure 25:
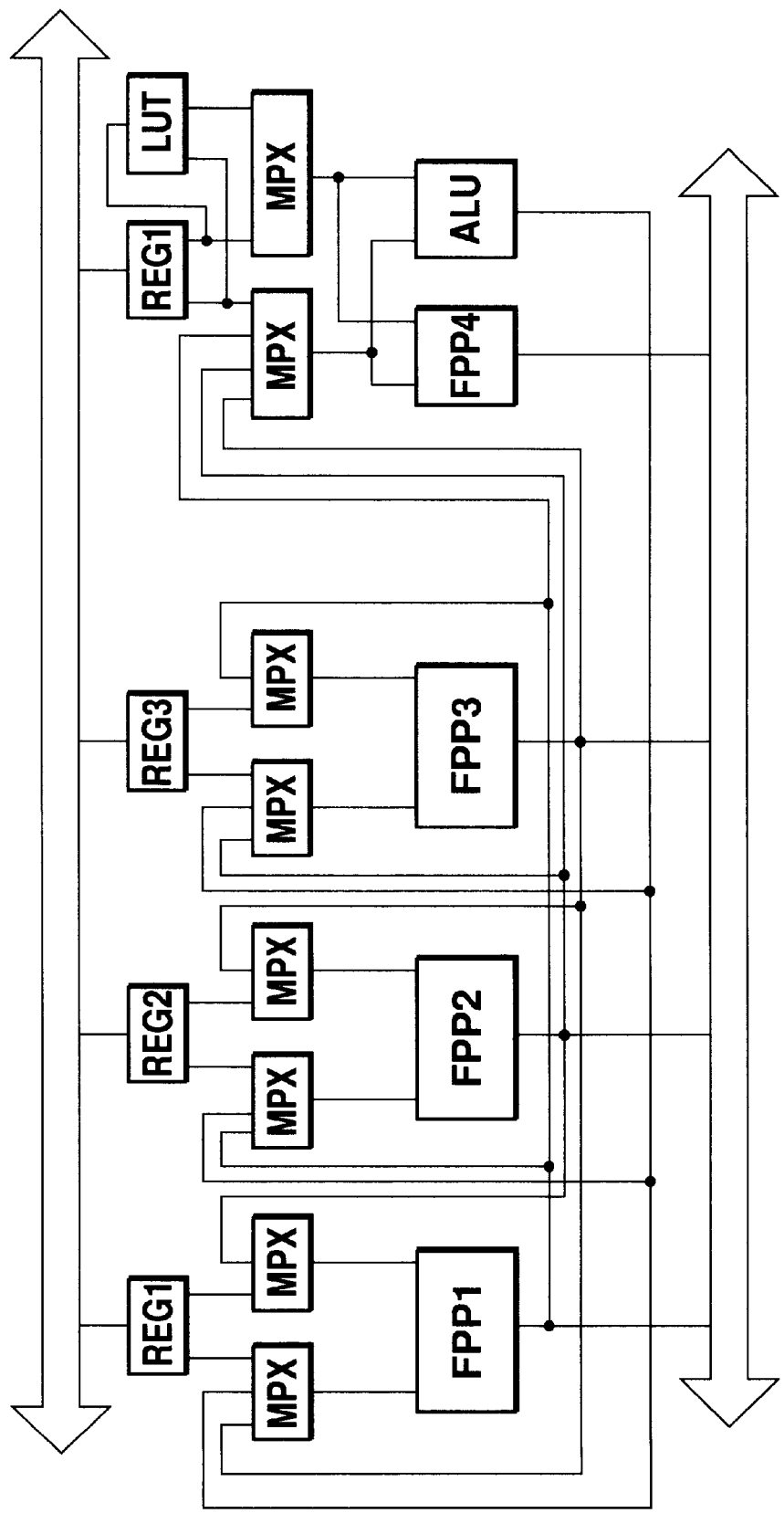
FIG. 25 is a detailed block diagram showing a conventional 3-D image generation apparatus.
Figure 27:
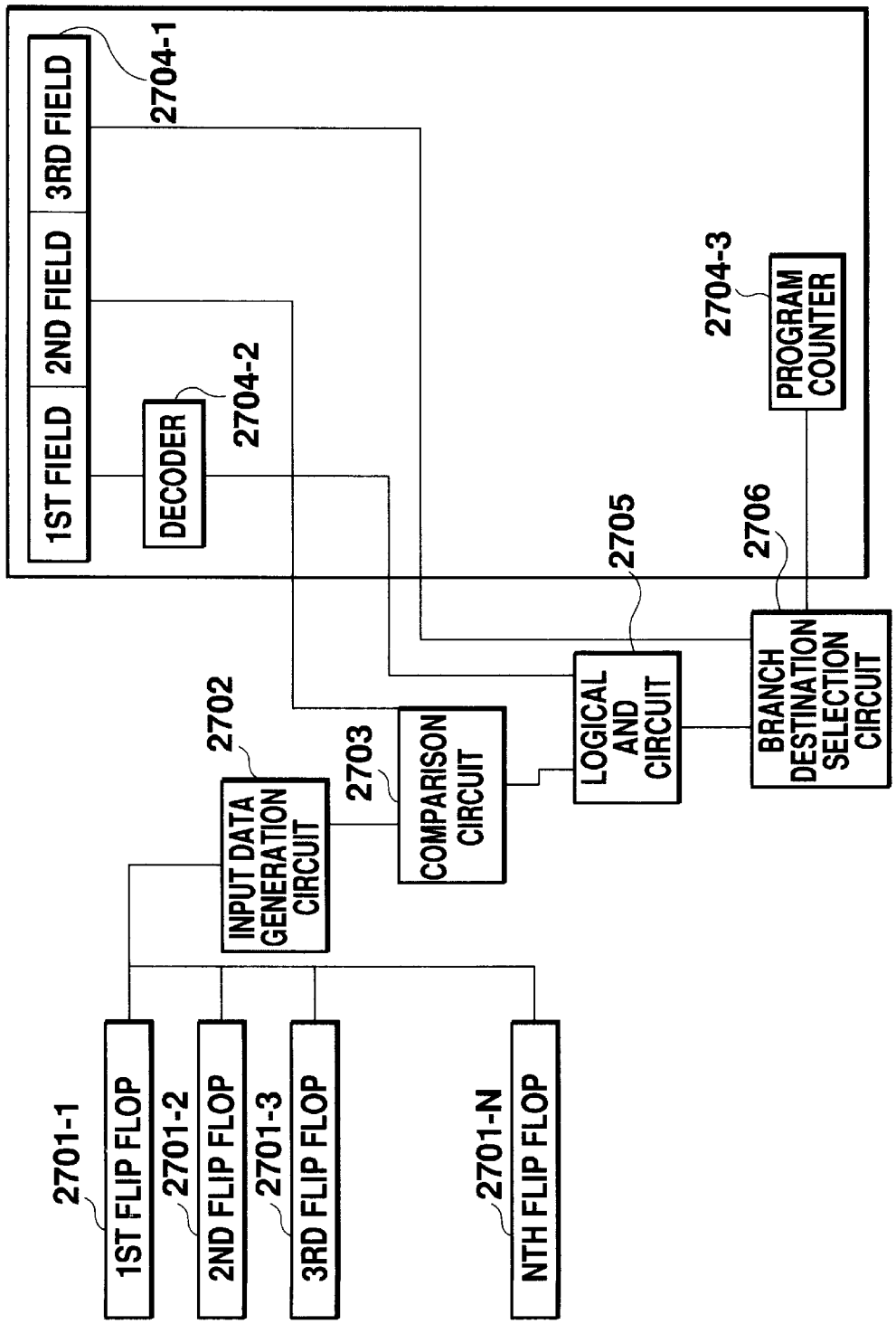
FIG. 27 is a block diagram showing a conventional sequential controller.
Figure 28:
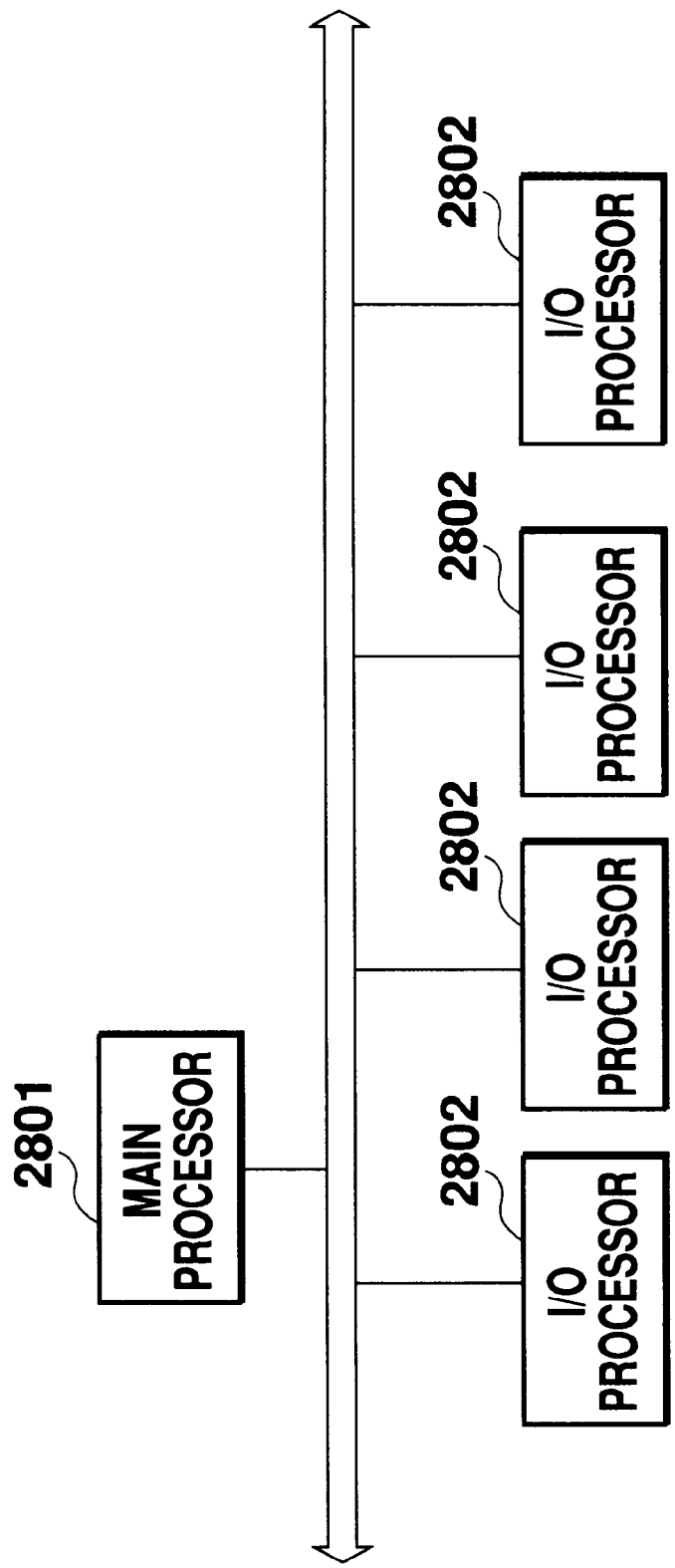
FIG. 28 is a diagram for explaining conventional multicast transfer.

The operations of the four FPUs are instructed by one instruction, so that the four FPUs conduct identical operations. When one operation is to be executed a plurality of times using different data, the respective FPUs will operate independently, rather than the plurality of connected FPUs operating dependently from one another. That is, since the FPUs are not connected as shown in FIG. 25, one instruction can trigger four identical operations using different data. With this arrangement, it is possible to reduce not only the overall operational time but also the total number of step of a program held in the instruction memory to one fourth of those in the conventional apparatus.

An example will be described in the following.

For coordinate transformation in a 3-D operation, the same dimensional coordinate system of (X, Y, Z, W) is often used. Assume that FPU1-103, FPU2-104, FPU3-105, and FPU4-106 handle X, Y, Z and W coordinates, respectively. In this event, it is possible to execute coordinate transformation through identical operations using different data for X, Y, Z and W coordinates. The transformation can be expressed by the expression 2. The elements M11 to M44 of the expression 2 constitute a matrix which indicates rotation, expansion/reduction, and translation in a 3-D space.

$$\begin{pmatrix} X' \\ Y' \\ Z' \\ W' \end{pmatrix} = \begin{pmatrix} M11 & M12 & M13 & M14 \\ M21 & M22 & M23 & M24 \\ M31 & M32 & M33 & M34 \\ M41 & M42 & M43 & M44 \end{pmatrix} \begin{pmatrix} X \\ Y \\ Z \\ W \end{pmatrix} \quad (2)$$

Figure 2:
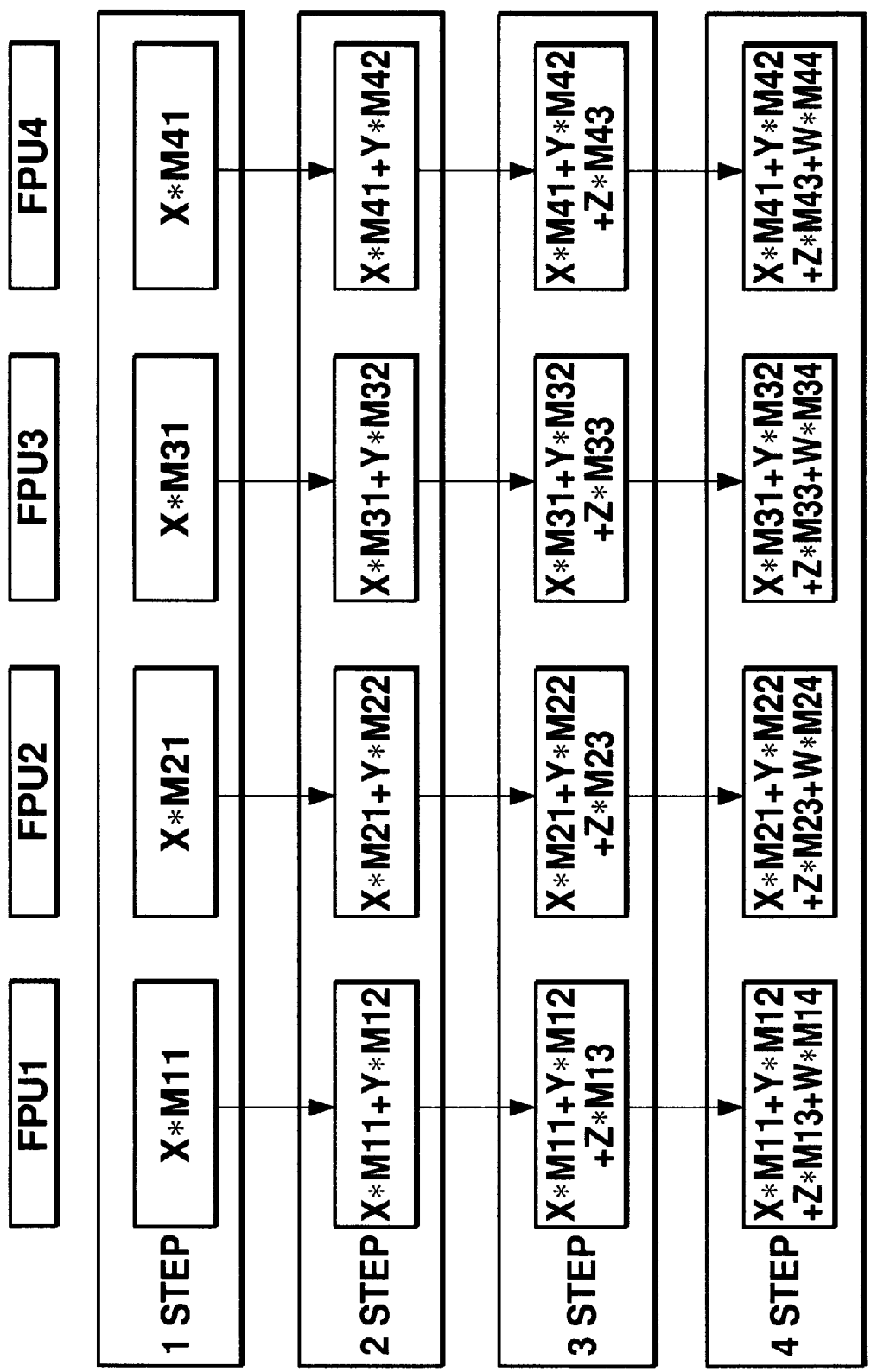
FIG. 2 is a step chart for a coordinate transformation operation using the geometrical operation apparatus according to the first embodiment.

FIG. 2 is a step chart for coordinate transformation by the present apparatus. FLM1-107 is pre-loaded with data for X, Y, Z, W, M11, M12, M13, and M14. Likewise, FLM2-108, FLM3-109, and FLM4-110 are pre-loaded with data for X, Y, Z, W, M21, M22, M23 and M24, data for X, Y, Z, W, M31, M32, M33 and M34, and data for X, Y, Z, W, M41, M42, M43 and M44, respectively. When a mathmatical operation instruction is supplied to FPU 1-103, FPU 2-104, FPU 3-105 and FPU 4-106, matrix operations between 4×4 and 1×4 matrices are executed through four steps as shown in FIG. 2.

In luminance calculation, color data for (R,G,B) are generally used. Similar to coordinate transformation, luminance calculation can be made through identical operations using different data. That is, FLM1-107, FLM1-108, and FLM1-109 are first provided with different data necessary for obtaining values of R, G, and B respectively. As a result, it is possible to reduce the time taken to complete coordinate transformation to one fourth compared to a case where coordinate transformation is performed for every coordinate, and to reduce the time taken to complete luminance calculation to one third compared to a case where luminance calculation is made for every color of (R,G,B).

As described above, according to this embodiment, it is possible to execute geometrical operations at a high speed through an enhanced parallel extent of parallel operations due to provision of local memories FLM1-4 connected to the global bus 117, and individually operative floating processing units FPU1-4 connected to the local memories FLMs1-4.

Although four FPUs are employed in the above embodiment, it should be noted that the construction is not limited to four units. When two units are provided, for instance, operations for FPU1 and FPU2 in FIG. 2 are carried out simultaneously first, and operations for FPU3 and FPU4 are carried out next. As a result, eight steps will complete an operation for one vertex. With three units, eight steps will complete the operation, similar to two units. With eight to eleven units, four steps will do for two vertices of an object since two sets of FPUs1-4 will operate at the same time. With twelve to fifteen units, four steps will do for three vertices.

As described above, the number of FPUs is not limited to four, though provision of a fourfold number of units will be efficient in executing the above calculation.

[Embodiment 2]

Figure 3:
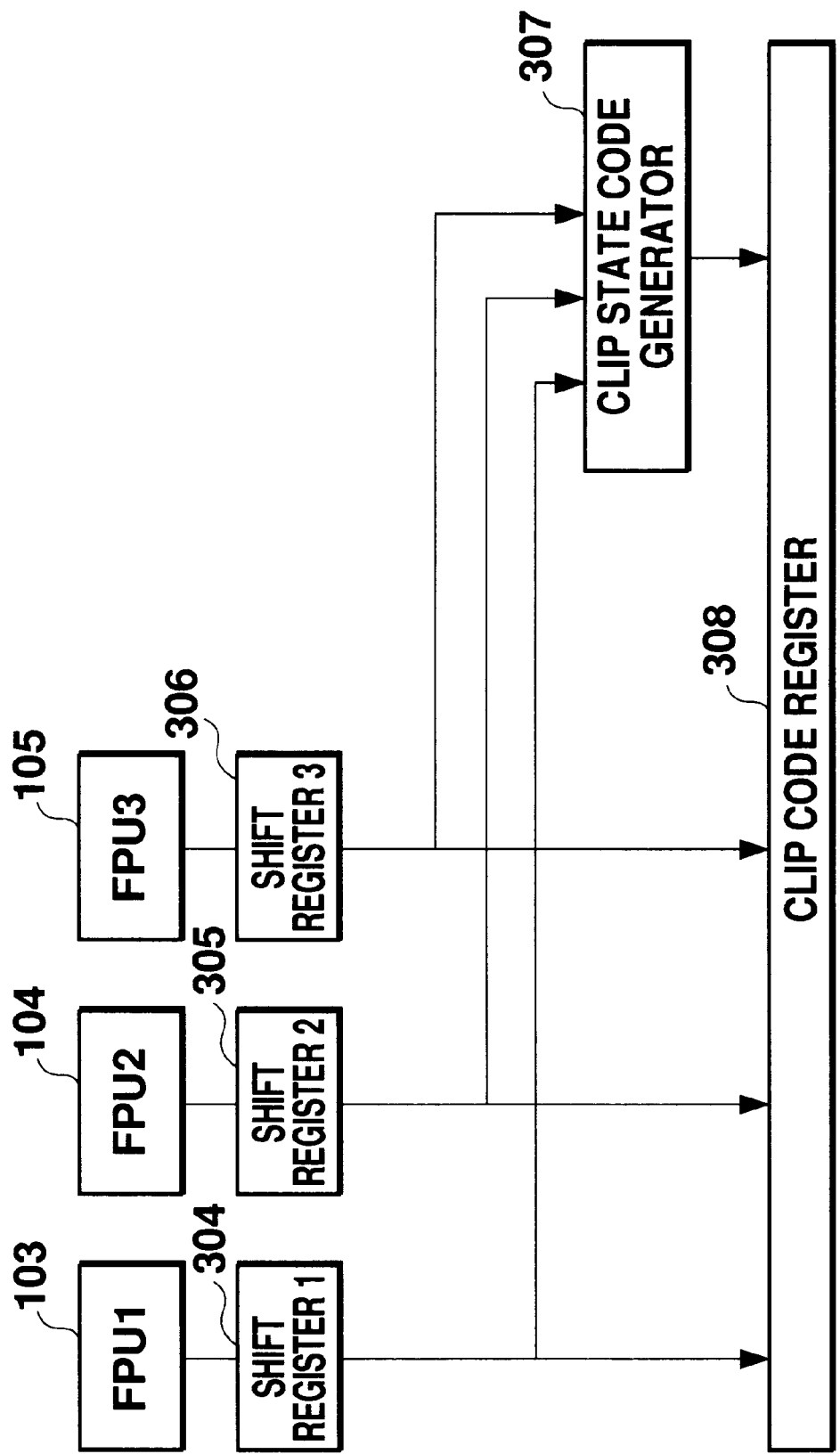
FIG. 3 is a block diagram showing a geometrical operation apparatus according to a second embodiment of the present invention.
Figure 4:
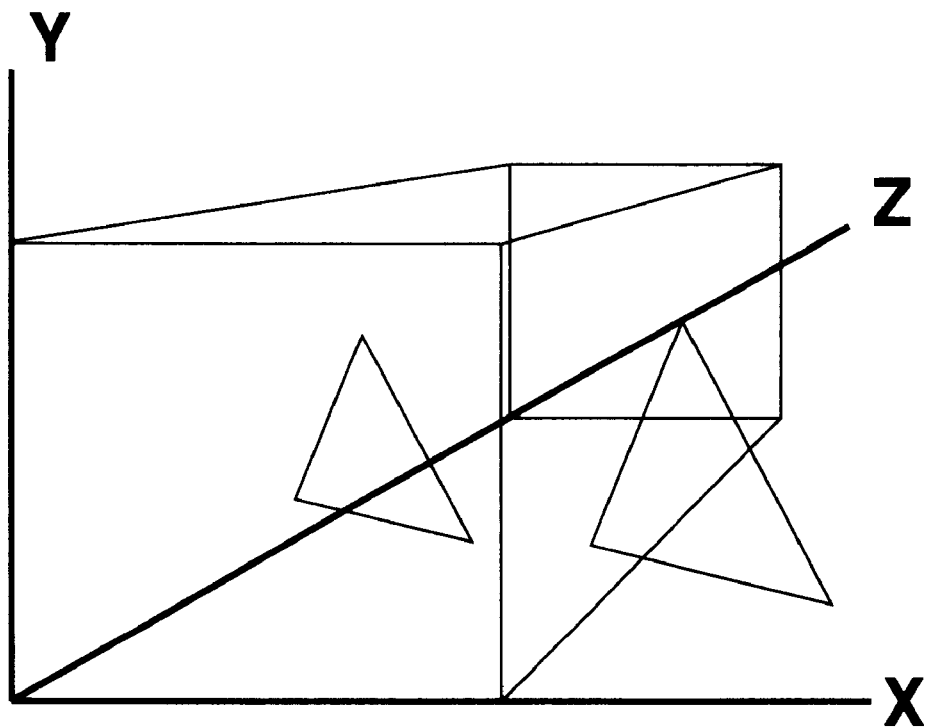
FIG. 4 shows a clip space.
Figures 5A, 5B, 5C, 5D:
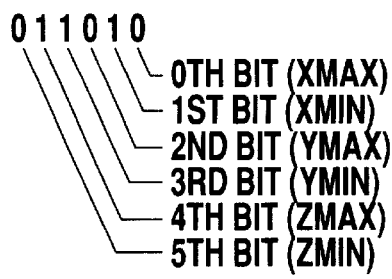
FIG. 5(a) shows clip codes.
FIG. 5(b) shows clip codes.
FIG. 5(c) shows clip codes.
FIG. 5(d) shows clip codes.

A second preferred embodiment of the present invention will next be described. FIG. 3 is a block diagram showing a structure of a geometrical operation apparatus of the second embodiment. The elements 103 to 105 in FIG. 3 correspond to FPU1 to FPU3 in the foregoing first embodiment. FPU1-103, FPU2-104, and FPU3-105 are respectively connected to 6-bit shift registers 304, 305, and 306, which each hold clip codes generated by FPU1-103 to FPU3-105 for three vertices. The clip codes from FPU1-103 to FPU3-105 are supplied to a clip state code generator 307, which in turn generates a clip state code. The clip state code indicates a positional relationship between an object formed with three vertexes and clip frames which define a clip space. A clip code and a clip state code are both held in a clip code register 308. A clip code indicates if an object is positioned inside or outside a clip space of a rectangular parallelopiped which is defined by clip frames of six clip plates (X=XMAX, X=XMIN, Y=YMAX, Y=YMIN, Z=ZMAX, Z=ZMIN) as shown in FIG. 4. When a vertex of the object is positioned inside the clip space with respect to each of the six plates of clip frames, such a positional relationship is indicated with binary "1." On the contrary, when a vertex is positioned outside the clip space, binary "0" is used for indication. FIGS. 5(a)–5(c), corresponding to FIG. 4 viewed from the origin in the Z direction, show clip codes. Using Z=ZMAX and Z=ZMIN as criteria, FIG. 5(a) shows spaces of the clip space in FIG. 4, whose Z coordinates are larger than ZMAX; FIG. 5(b) shows spaces thereof whose Z coordinates are between ZMAX and ZMIN; and FIG. 5(c) shows spaces thereof whose Z coordinates are smaller than ZMIN. As is apparent from FIG. 5(d), a clip code for a 3-D cube consists of the 0th to 5th bits which are respectively associated with the maximum and minimum values of clip frames in each directions. More specifically, the 0th and 1st bits are associated with the maximum (XMAX) and minimum values (XMIN) of clip plates in the X direction; the 2nd and 3rd bits are associated with the maximum (YMAX) and minimum values (YMIN) of clip plates in the Y direction; and the 4th and 5th bits are associated with the maximum (ZMAX) and minimum values (ZMIN) of clip plates in the Z direction. With this allotment, it is possible to generate clip codes for 3-D cubic clip spaces.

FIG. 5(a) is taken as an example for a further description. An object in the spaces shown in FIG. 5(a) must be positioned outside the clip space with respect to the clip frame Z=ZMAX, and inside with respect to the clip frame Z=ZMIN. Thus, all the 4th and all the 5th clip code bits of the object indicate "1" and "0," respectively. Further, the 0th clip code bits of the spaces inside the clip space with respect to X=XMAX (spaces 11, 12, 14, 15, 17, and 18) and those of the outside spaces (spaces 13, 16, and 19) indicate "0" and "1," respectively. The 1st clip code bits of the spaces inside the clip space with respect to X=XMIN (spaces 12, 13, 15, 16, 18, and 19) and those of the outside spaces (spaces 11, 14, and 17) indicate "0" and "1," respectively. The 2nd clip code bits of the spaces inside the clip space with respect to Y=YMAX (spaces 14, 15, 16, 17, 18, and 19) and those of the outside spaces (spaces 11, 12, and 13) indicate "0" and "1," respectively. The 3rd clip code bits of the spaces inside the clip space with respect to Y=YMIN (spaces 11, 12, 13, 14, 15, and 16) and those of the outside spaces (spaces 17, 18, and 19) indicate "0" and "1," respectively.

In operation, FPU1-103, FPU2-104 and FPU3-105 generate clip codes to be supplied to the shift registers 304, 305 and 306, respectively. The shift registers 304, 305, and 306, which can hold clip codes for three vertices, shift the fields thereof so as to drop the oldest clip code contained therein. The data in the shift registers 304, 305, and 306 are loaded to both the clip state code generator 307 and the clip code register 308. The clip state code generator 307 generates a clip state code through logical operations between supplied clip codes. A clip state code includes flags for indicating whether an object to be drawn is positioned inside (clip-in), outside (clip-out), or intersects (clip) the clip space. A clip state code further includes flags for indicating whether an object intersects a plate of XMAX, XMIN, YMAX, YMIN, ZMAX or ZMIN. The clip state code generator 307 outputs the clip state code to the clip code register 308.

Figure 6:
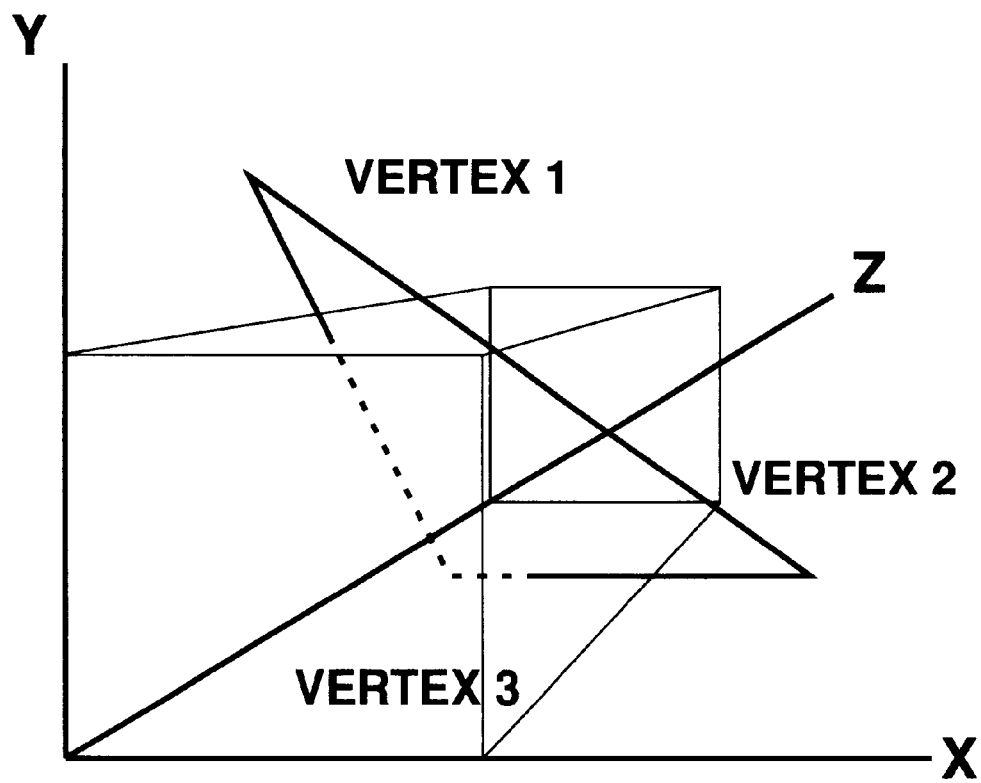
FIG. 6 shows an example of a clip space and an object.

A specified example will be described next. FIG. 6 shows a clip space and a triangular object whose first vertex is positioned outside the clip space with respect to Y=YMAX, second vertex is outside with respect to X=XMAX, and third vertex is inside the clip space. In this example, FPU1-103, FPU2-104, and FPU3-105 generate clip codes regarding clip plates in the X, Y, and Z directions, respectively.

Figure 7:
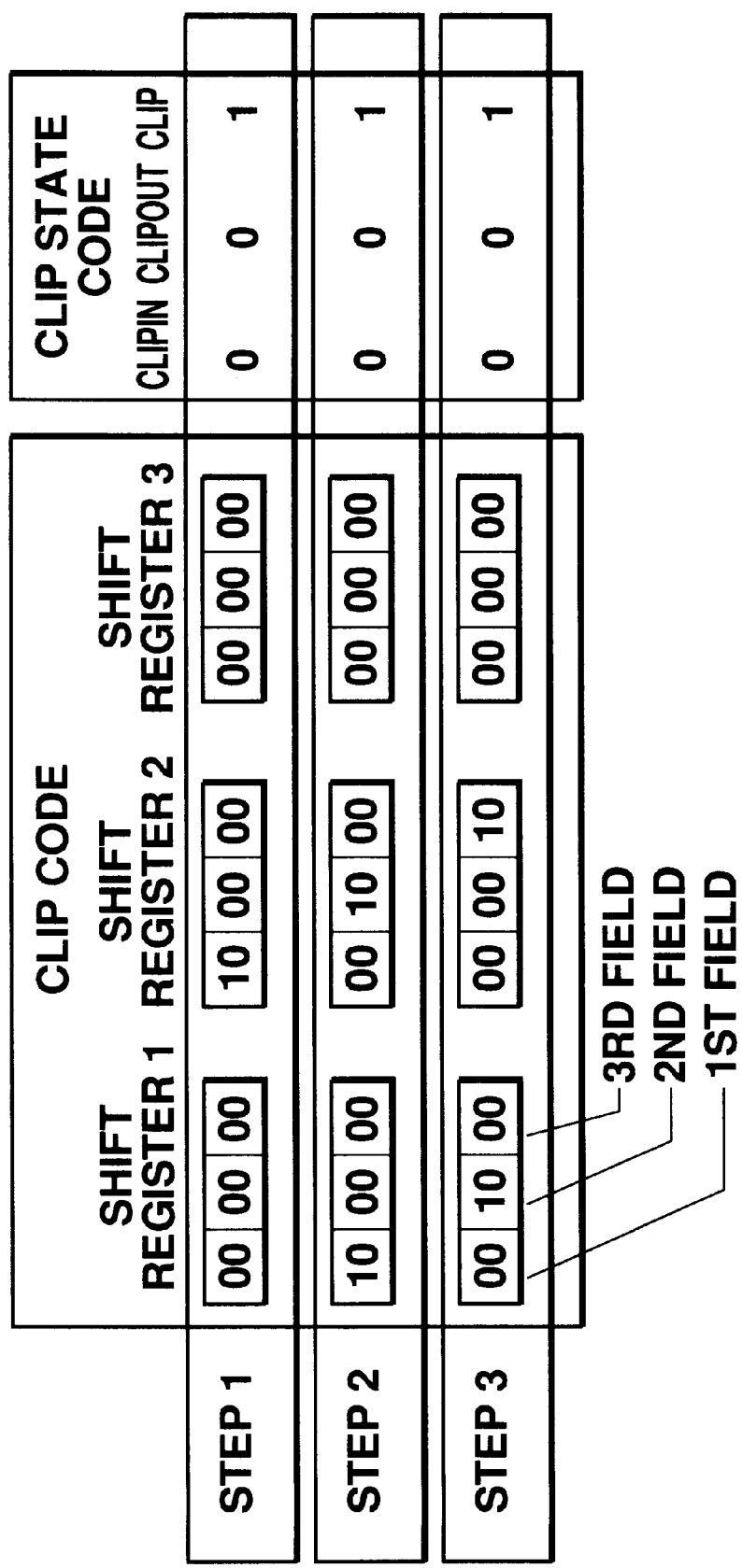
FIG. 7 shows register contents for the example shown in FIG. 6.

When an instruction is executed to generate a clip code for the first vertex, FPU1-103, FPU2-103, and FPU3-104 conduct simultaneous operations regarding clip plates and an X coordinate, clip plates and a Y coordinate, and clip plates and a Z coordinate of the vertex, respectively. As a result, FPU1-103, FPU2-103, and FPU3-104 generate clip codes with respect to the clip plates XMAX and XMIN, YMAX and YMIN, and ZMAX and ZMIN, respectively, as (XMAX, XMIN) 00, (YMAX, YMIN) 10, and (ZMAX, ZMIN) 00, so that the whole clip code for the first vertex (XMAX, XMIN, YMAX, YMIN, ZMAX, ZMIN) 001000 is obtained. The clip codes regarding X, Y, and Z coordinates are respectively loaded to the first field of the shift registers 304, 305, and 306, which are respectively connected to FPU1-103, FPU2-104, and FPU3-105. The clip codes for three vertexes, stored in the shift registers 304, 305, and 306, are loaded to the clip code register 308 and also to the clip state code generator 307, which in turn generates a clip state code. The clip code bits in the respective shift registers 304, 305 and 306, and the clip state code at this stage are shown in FIG. 7, step 1. As is apparent from the drawing, the respective shift registers 304, 305, and 306 contain, in their first fields, clip code bits which will together constitute a whole clip code 001000.

Likewise, FPU1-103, FPU2-104, and FPU3-105 simultaneously generate clip code bits for the second vertex, i.e., 10, 00, and 00, respectively. After the shift registers 304, 305, and 306 shift their fields, the generated clip codes for the second vertex are loaded to the respective shift registers 304, 305, and 306, and the clip state code 308 generates a clip state code. The clip codes in the respective shift registers 304, 305 and 306, and the clip state code at this stage are shown in FIG. 7, step 2.

As is apparent from the drawing, the respective shift registers 304, 305, and 306 contain, in their first fields, clip codes which will together constitute a clip code 1000000 for the second vertex, and, in the second fields, clip codes which will together constitute a clip code 001000 for the first vertex. Further, the clip state codes indicate that a line segment consisted of the first and second vertices is in a clip state.

Further, FPU1-103, FPU2-104, and FPU3-105 simultaneously generate clip code bits for the third vertex, i.e., 00, 00, and 00, respectively. After the shift registers 304, 305, and 306 shift their fields, the generated clip code for the third vertex are loaded to the respective shift registers 304, 305, and 306, and that the clip state code 308 generates a clip state code. The clip code bits in the respective shift registers 304, 305 and 306, and the clip state code at this stage are shown in FIG. 7, step 3. As is apparent from the drawing, the respective shift registers 304, 305, and 306 contain, in the first fields, clip code bits which will together constitute a clip code 000000 for the third vertex, in the second fields, clip code bits which will together constitute a clip code 100000 for the second vertex, and in the third fields, clip code bits which will together constitute a clip code 001000 for the first vertex. Further, the clip state codes indicate that a triangular object consisted of the first, second, and third vertexes is in a clip state.

In order for the program to be branched into any one of the three processes, that is, a process for a clip-in vertex, a process for discarding vertex data for a clip-out vertex, and a process for cutting off a part of a clip vertex which protrudes from a clip space, IPU can make a clip judgement referring to the clip code register which holds clip codes and clip state codes for the three vertices.

As described above, according to the second preferred embodiment, clip tests are performed for X, Y, and Z plates simultaneously, which allows a high speed clip test by reducing the time necessary for the tests to one third of the time necessary with the prior art in which clip tests are performed one by one for the X, Y, and Z plates.

[Embodiment 3]

Figure 8:
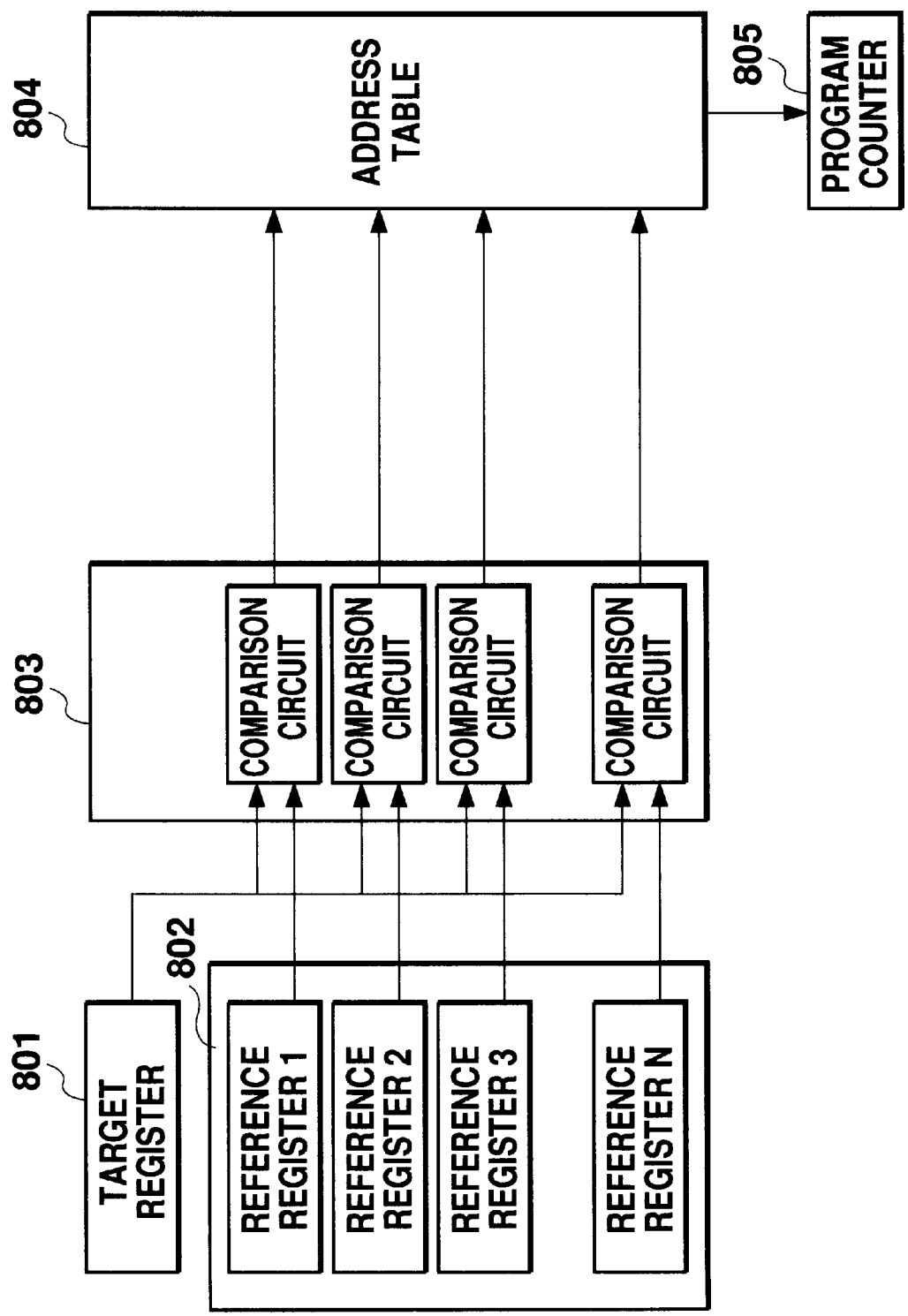
FIG. 8 is a block diagram showing the construction of a program counter controller according to a third preferred embodiment of the present invention.

A third preferred embodiment will next be described. FIG. 8 is a block diagram showing in detail a program counter controller 116 of the first embodiment. FIG. 8 includes a target register 801 for holding n bit patterns, each indicating "care/don't care" or "true/false" for a condition; a reference register 802 for holding a particular condition pattern of the above condition patterns; a comparator 803 for comparing data in the target register 801 and in the reference registers 802 to see whether they match, and outputting the number of a reference register as a comparison result; an address table 804 for holding addresses of programs corresponding to respective conditions held in the reference registers 802; and a program counter 805 incorporated in a program counter controller 116, for indicating the address of the next instruction to be executed in the instruction memory 115.

The background of the third embodiment will be described. Assume that there are N branch conditions per one operation and each branch condition requires a particular process. In this case, $2^N$ ways of processing are possible, so branch judgements must be made N times. Generally, although $2^N$ ways of processing are possible, not all the $2^N$ branches occur with an equal frequency. In other words, condition branches which are frequently caused are usually limited to a few combinations. Nevertheless, branch judgements are conventionally made N times including ones for scarcely caused branches, which results in a longer operational time. In view of this situation, the third preferred embodiment aims to detect frequently caused operation branches at a high speed, so that the operational process is swiftly branched to a corresponding process.

The operation will be described with reference to FIG. 8. N conditions are expressed by N bit patterns. Respective bits in N bit patterns indicate "care/don't care" or "true/false" for respective conditions. Then, some bit patterns which are desired to be swiftly detected are selected from among N condition combinations, and registered in the reference registers 802.

Meanwhile, a bit pattern which is currently set is input to the target register 801. When a sequencer (not shown in FIG. 8) activates a branch operation instruction, the target register 801 and the reference registers 802 both supply their data to the comparison circuit in the comparator 803. The comparison circuit then compares the two data, and outputs a comparison result for every reference register 802. In this event, the comparison circuit outputs binary "1" for matching data from the target and reference registers 801 and 802, and binary "0" for different data. An address table 804 corresponding to the reference register 802 with a comparison result "1" is accessed, so that data held therein is retrieved. In this way, the operational process is branched to a desired process.

Figure 9:
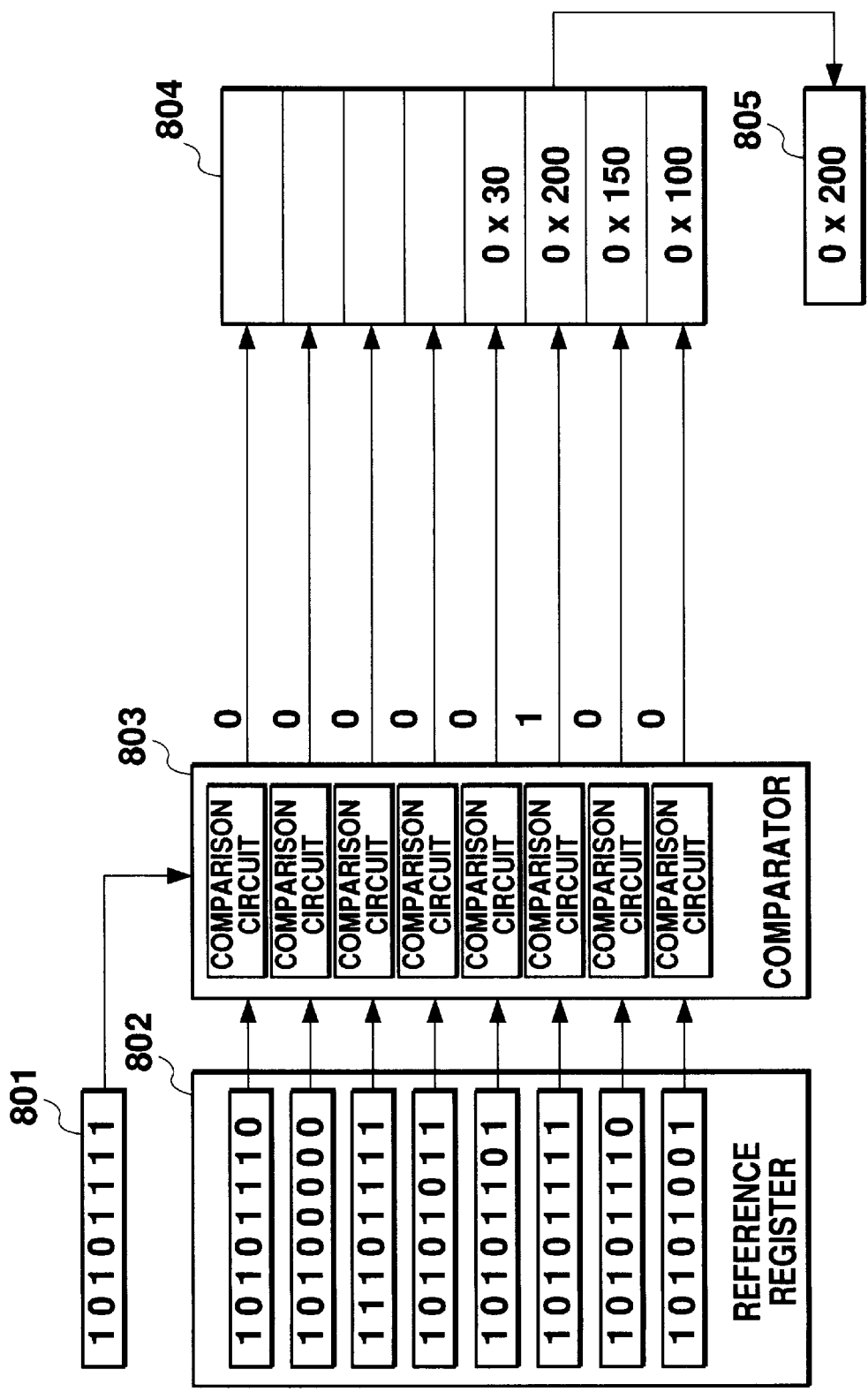
FIG. 9 shows an example of a program counter controller according to the third preferred embodiment.

A specified example will be described with reference to FIG. 9. Assume that the target register 801 and the reference registers 802 are 8 bit registers, and that the target register 801 and the sixth reference register 802 hold data "10101111," while other reference registers 802 hold different data. Further, assume that the address table 804 includes an address of a program to be branched corresponding to every reference register 802.

Upon activation of a branch operation instruction, the target and reference registers 801 and 802 supply their data to the comparator 803 for the comparator 803 to compare those data. In this example, since the reference register 802 whose comparison result indicates binary "1" is the sixth register, the comparator 803 outputs data "00000100." Then, as shown in FIG. 9, a register table corresponding to the sixth register is accessed, so that data "0×200" is read therefrom, and registered in the program counter 805. The process is thus branched to the address "0×200".

As described above, according to the third preferred embodiment, it is possible to branch into a process or processes corresponding to a specified one or more of a plurality of branches quickly.

[Embodiment 4]

Figure 10:
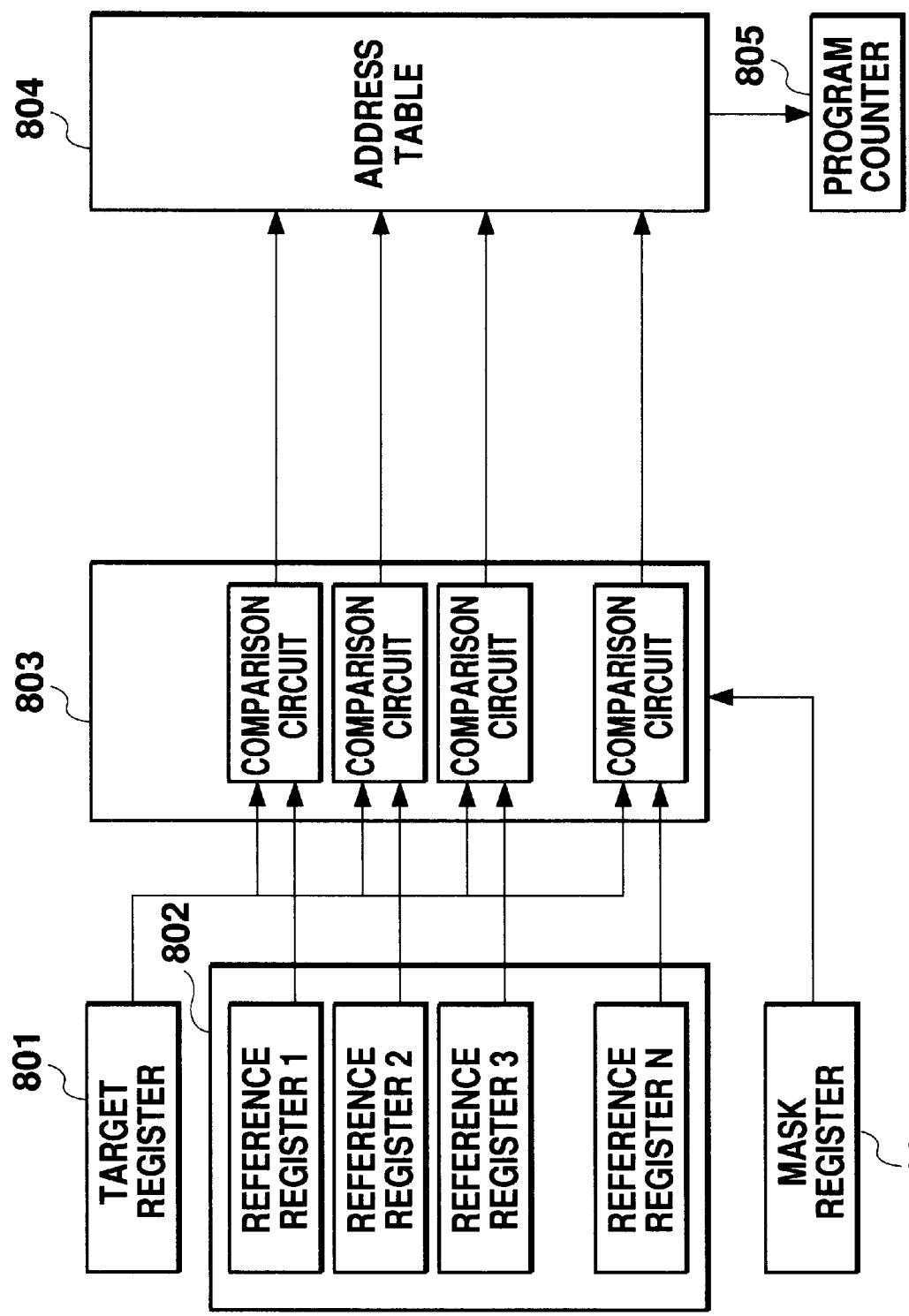
FIG. 10 is a block diagram showing the construction of a program counter controller according to a fourth preferred embodiment of the present invention.

A fourth preferred embodiment of the present invention will next be described. FIG. 10 is a block diagram showing the construction of a program counter controller of the fourth embodiment, which is constituted by including a mask register 1001 in the construction of the third embodiment.

The operation will be described. In comparison between data from the target register 801 and data from the reference registers 802, a register bit(s) in the data is (are) masked or neglected. As a result, it is possible to designate "care/don't care" for some of the conditions designated by N bits, which will allow detailed condition branches. In this embodiment, register bits corresponding to the bits with binary "1" in the mask register 1001 are "don't care" or not referred to in the comparison, whereas those corresponding to the bits with binary "0" are "care" or referred to.

Figure 11:
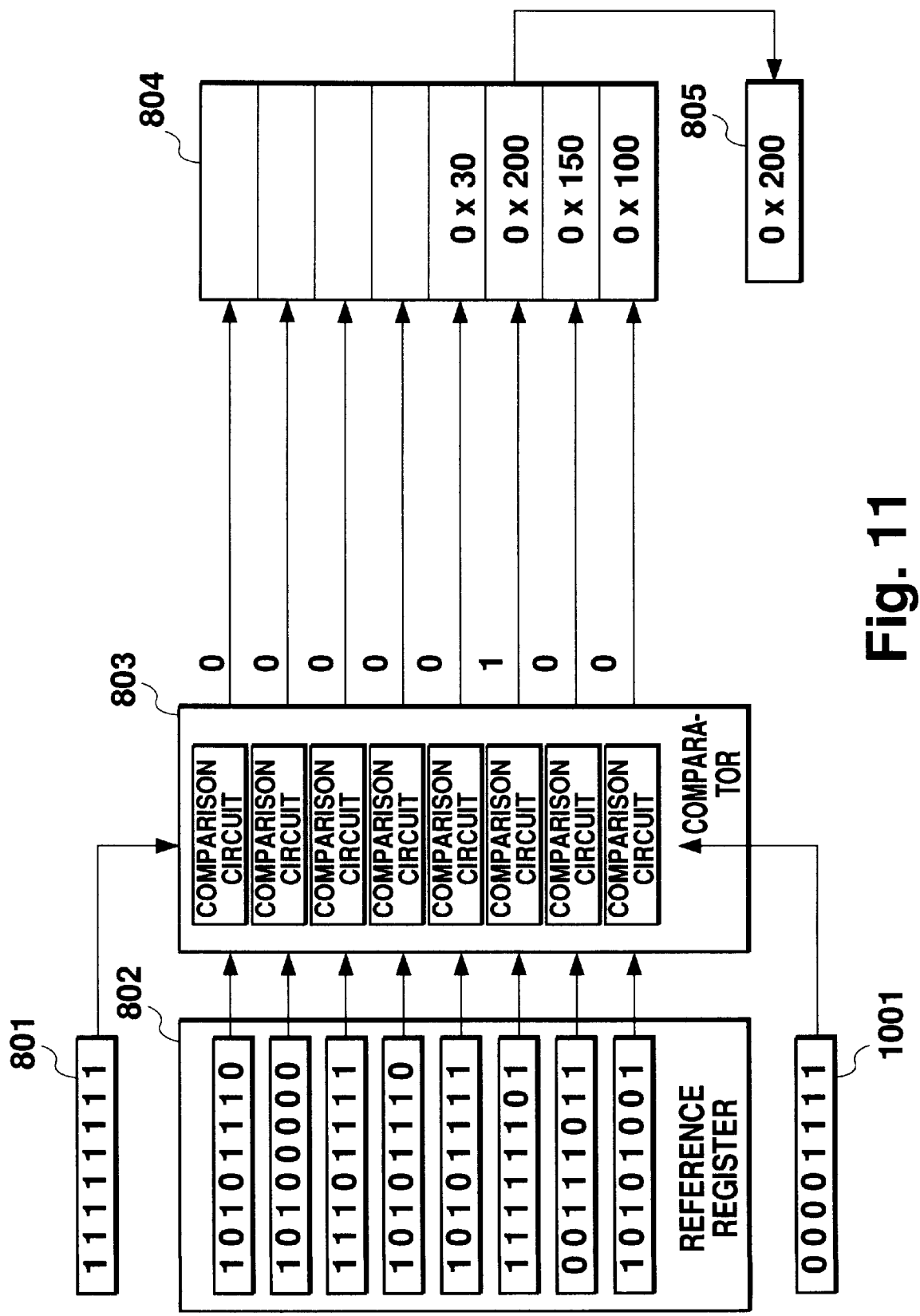
FIG. 11 shows an example of a program counter controller according to the fourth preferred embodiment.

A specific example will be described with reference to FIG. 11. Assume that the target register 801 and the reference registers 802 are 8 bit registers; the target register holds data "11111111"; the sixth reference register 802 holds data whose upper four bits are the same as those of the data in the target register, e.g., "11111101"; other reference registers 802 hold different data; and the mask register 1001 holds "00001111." Further, assume that the address table 804 includes an address of a program to be branched corresponding to every reference register 802.

Upon activation of a branch operation instruction, the target and reference registers 801 and 802 supply their data to the comparator 803 for the comparator 803 to compare those data. In this event, comparison is made only for the register bits which are instructed to be "care" or referred to by the binary value of the data in the mask register 1001. In this example, the binary data in the mask register 1001 shows "00001111," which means that the upper four bits of the register bits should be referred to in the comparison. Since it is detected that the reference register 802 whose comparison result shows binary "1" is the sixth one, the comparator 803 outputs data "00000100." Then, as shown in FIG. 11, an address table 804 corresponding to the sixth reference register 802 is accessed, so that data "0×200" is read therefrom and registered in the program counter 805. The process is thus branched to the address "0×200."

As described above, according to the fourth preferred embodiment wherein a mask function is added, it is possible to make various condition judgements.

[Embodiment 5]

Figure 12:
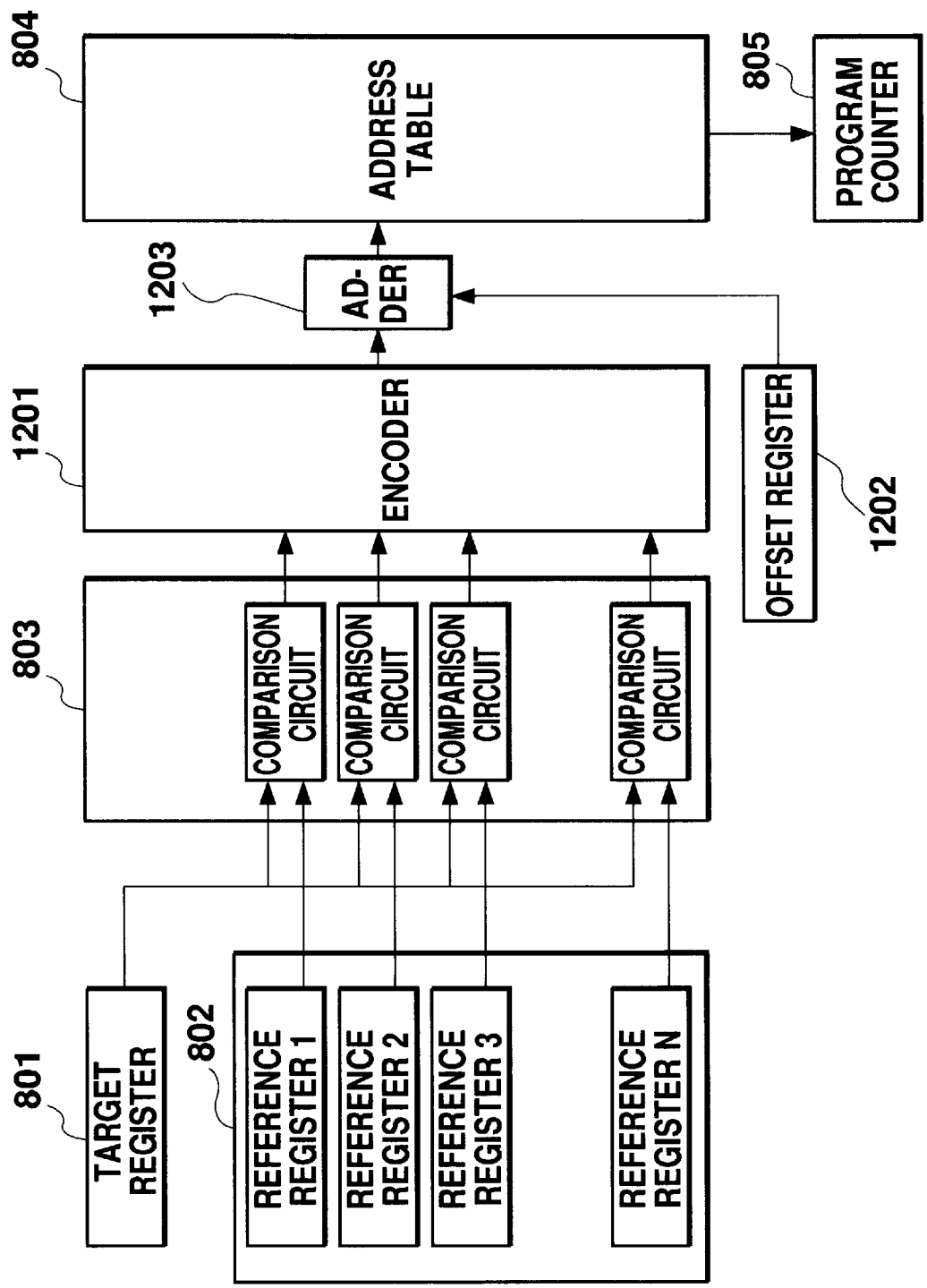
FIG. 12 is a block diagram showing the construction of a program counter controller according to a fifth preferred embodiment of the present invention.

A fifth preferred embodiment of the present invention will be described. FIG. 12 is a block diagram showing a construction of a program counter controller of the fifth embodiment, which is constituted by including an encoder 1201, an adder 1203, and an offset register 1202 in the structure of the third embodiment. The encoder 1201 encodes a comparison result yielded by the comparator 803. The offset register 1202 holds an offset value to be added to the encoded result. The adder 1203 adds the encoded value and the offset value.

The basic operation is the same as that of the third embodiment. The comparator 803 compares data from the target and reference registers 801 and 802, and outputs the comparison result to the encoder 1201. Reading the offset value from the offset register 1202, the adder 1203 adds the read value to the output of the encoder 1201, and outputs the added result as an address in the address table 804 to be referred to. The address table 804 is accessed at the address output by the adder 1203, so that data is read therefrom to be set in the program counter 805. The operation is thus branched.

Figure 13:
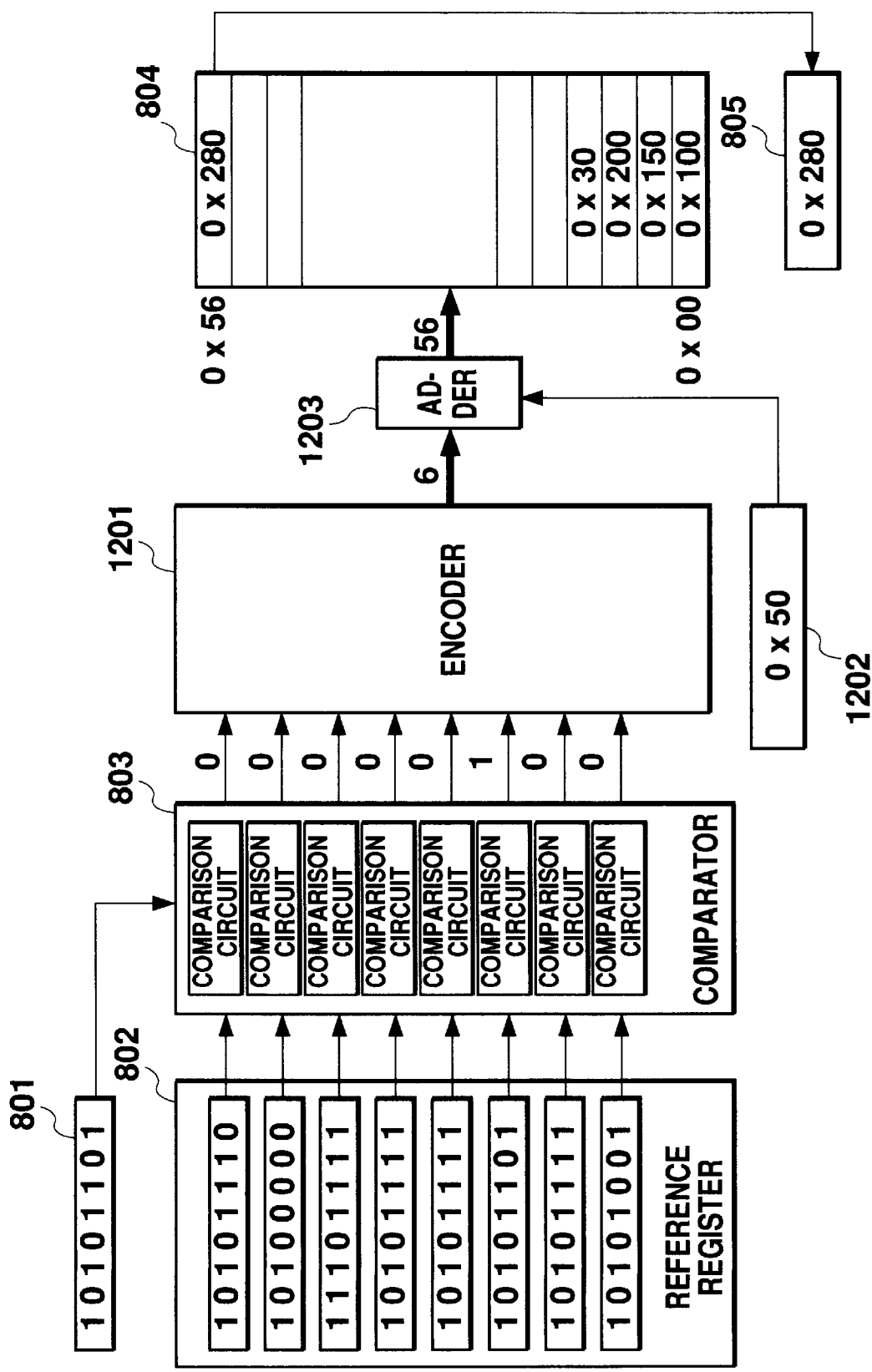
FIG. 13 shows an example of a program counter controller according to the fifth preferred embodiment.

A specific example will be described with reference to FIG. 13. Assume that the target register 801 and the reference registers 802 are 8 bit registers; the target register 801 and the sixth reference register 802 hold data "10101101"; other reference registers hold different data; and the offset register 1202 includes data "0×50." Further, assume that the address table 804 includes a program address to be branched corresponding to combined conditions of those defined by data in the reference register 802 and in the offset register 1202.

Upon activation of a branch operation instruction, the target and reference registers 801 and 802 respectively supply their data to the comparator 803 for the comparator 803 to compare those data. The comparator 803 outputs the comparison result to the encoder 1201. Since the reference register 802 whose comparison result shows binary "1" is the sixth register, the encoder encodes the comparison result and outputs data "6." The encoded result "6" and the data "0×50" from the offset register 1202 are both supplied to the adder 1203, which adds those data and outputs data "0×56" so that an address "0×56" in the address table 804 is accessed. A sequencer (not shown in FIG. 13) retrieves a program address to be jumped to, i.e. "0×280," from the address "0×56" in the address table 804, and registers the retrieved program address "0×280" in the program counter 805. The operational process is thus branched to a program at address "0×280."

As described above, according to the fifth embodiment wherein an offset function is added, it is possible to set conditions for considering factors other than branch conditions, which allows various other branches.

[Embodiment 6]

Figure 14:
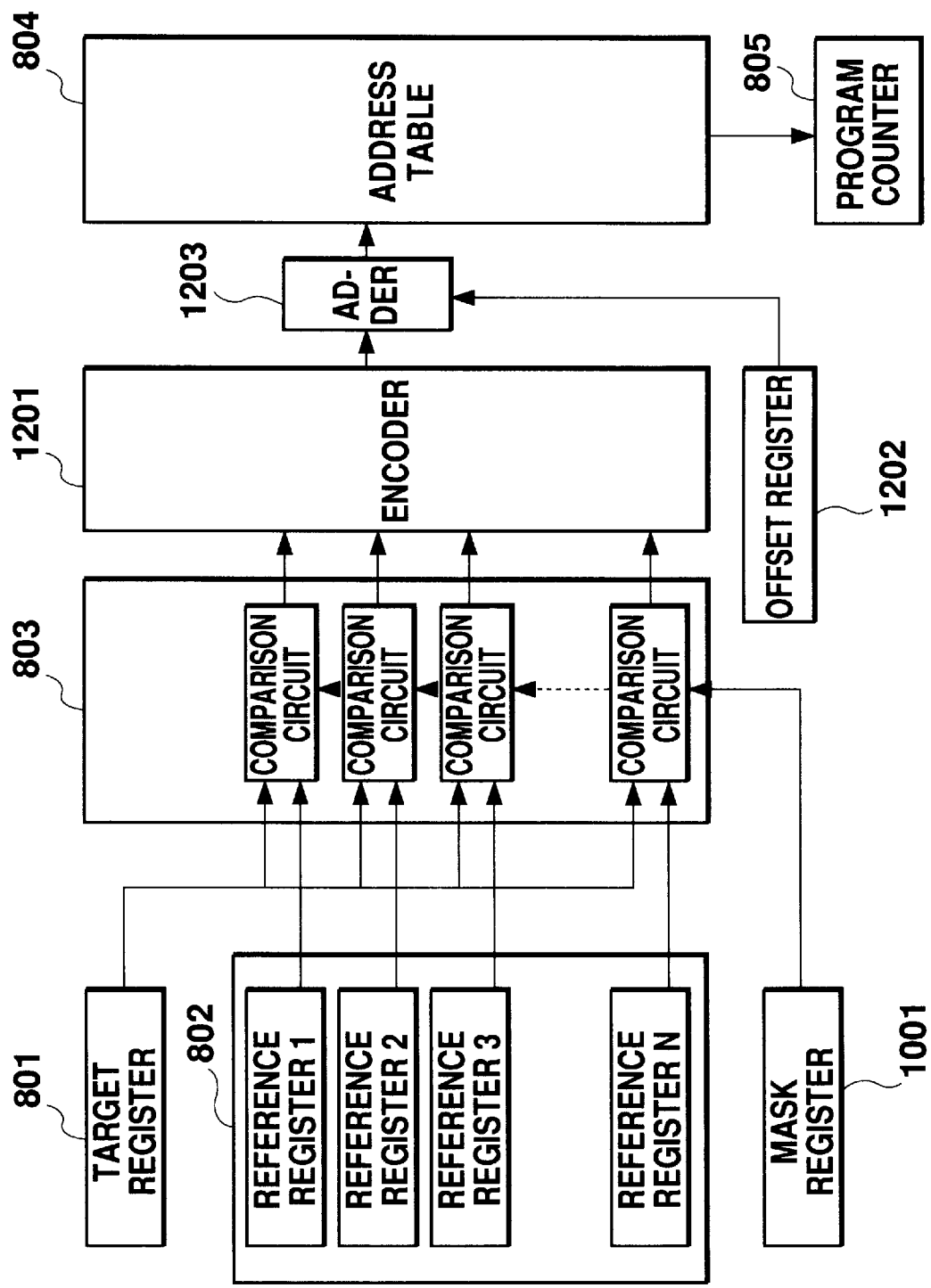
FIG. 14 is a block diagram showing the construction of a program counter controller according to a sixth preferred embodiment of the present invention.

A sixth preferred embodiment of the present invention will next be described. FIG. 14 is a block diagram showing a structure of a program counter controller of the sixth embodiment, which is constructed by combining constructions of the fourth and fifth embodiments.

The basic operation is the combination of those of the fourth and fifth embodiments, in which the comparator 803 compares data from the target and reference registers 801 and 802. For the comparison, the binary data in the mask register 1001 defines whether to "care/don't care" for a comparison relative to respective bits. The mask data indicates "don't care" or not to refer to the comparison with binary "1," and to "care" or refer to the comparison with binary "0." The comparator 803 supplies comparison result to the encoder 1201 for encoding. The offset register 1202 holds an offset value for an output of the encoder 1201. The adder 1203 adds the offset value and the encoded result, so that an address indicated by the encoded result in the address table 804 is accessed. A sequencer (not shown in FIG. 14) retrieves data from the address table 804, and registers the data in the program counter 805, whereby the program is branched. With this arrangement, it is possible to make various branches through combining conditions defined by data in the offset register 1202 and the mask register 1001.

Figure 15:
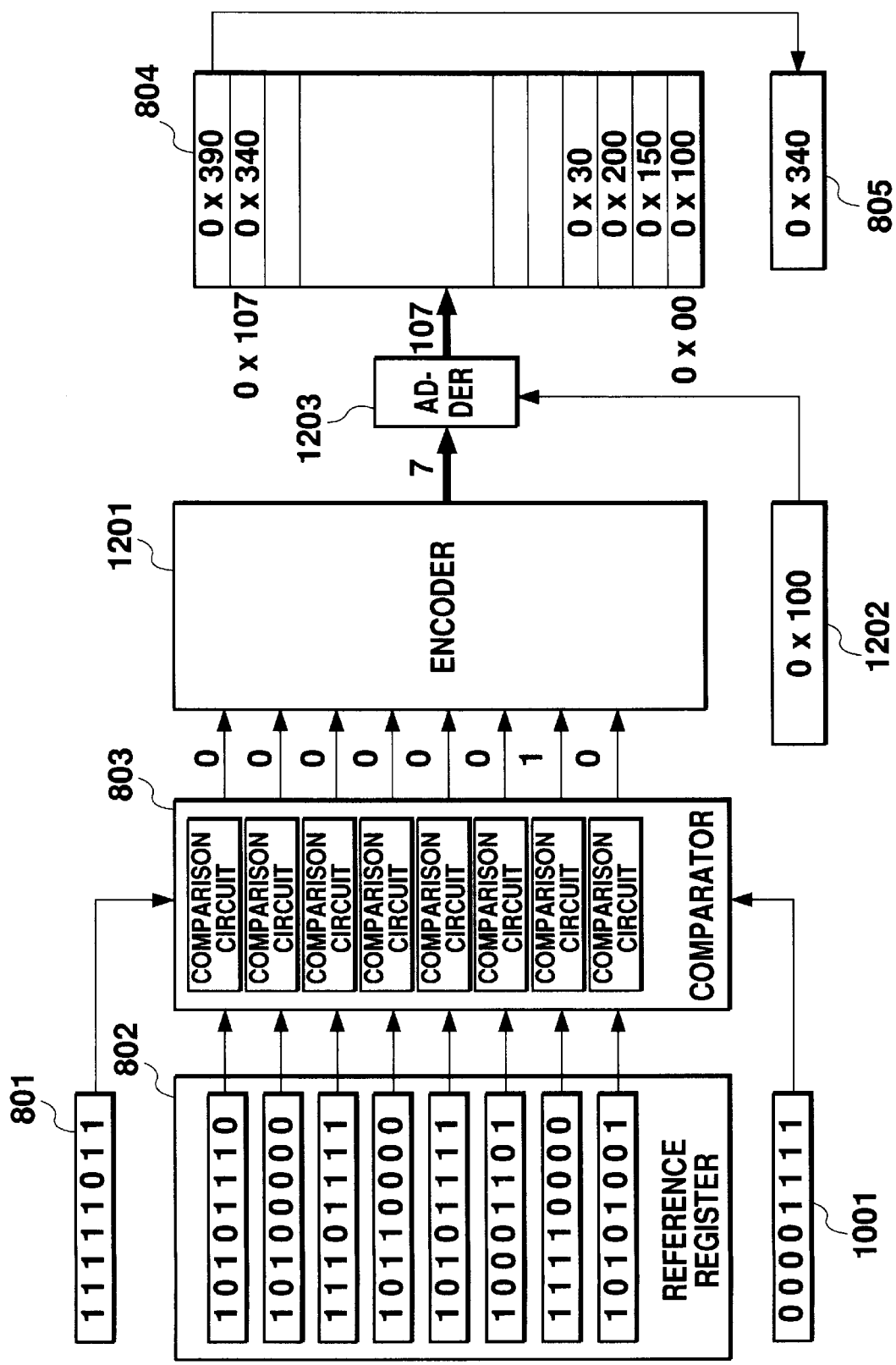
FIG. 15 shows an example of the program counter controller according to the sixth preferred embodiment.

A specific example will be described with reference to FIG. 15. Assume that the target register 801 and the reference registers 802 are 8 bit registers; the target register 801 holds data "11111011"; the seventh reference register 802 holds data whose upper four bits are the same as those of the data in the target register 801, e.g., "11110000"; other reference registers hold data whose upper four bits are different from those of the data in the target register 801; the mask register 1001 holds data "00001111"; and the offset register 1202 holds data "0×100." Further, assume that the address table 804 includes a program address to be branched to corresponding to combined conditions of those defined by data in the target and offset registers 802 and 1202.

Upon activation of a branch operation instruction, the target and reference registers 801 and 802 supply their data to the comparator 803 and the comparator 803 compares those data. The comparator 803 compares register bits of data corresponding to unmasked bits of data in the mask register 1001, i.e., the upper four bits in this example. It turns out, through comparison, that a reference register 802 whose upper four bits match those of the data in the target register 801 is the seventh reference register 802. The comparator 803 thus outputs data "00000010" to the encoder 1201, which then outputs encoded data "7." The adder 1203 adds the encoded data "7" and the data "0×100," held in the offset register 1202, and outputs data "0×107." The sequencer refers to the address "0×107" in the address table 804, and reads a program address "0×340" therefrom, to which the program jumps. The program address "0×340" is registered in the program counter 805. A program beginning at address "0×340" is executed.

According to the sixth preferred embodiment in which mask and offset functions are added, it is possible to make further various branches.

[Embodiment 7]

Figure 16:
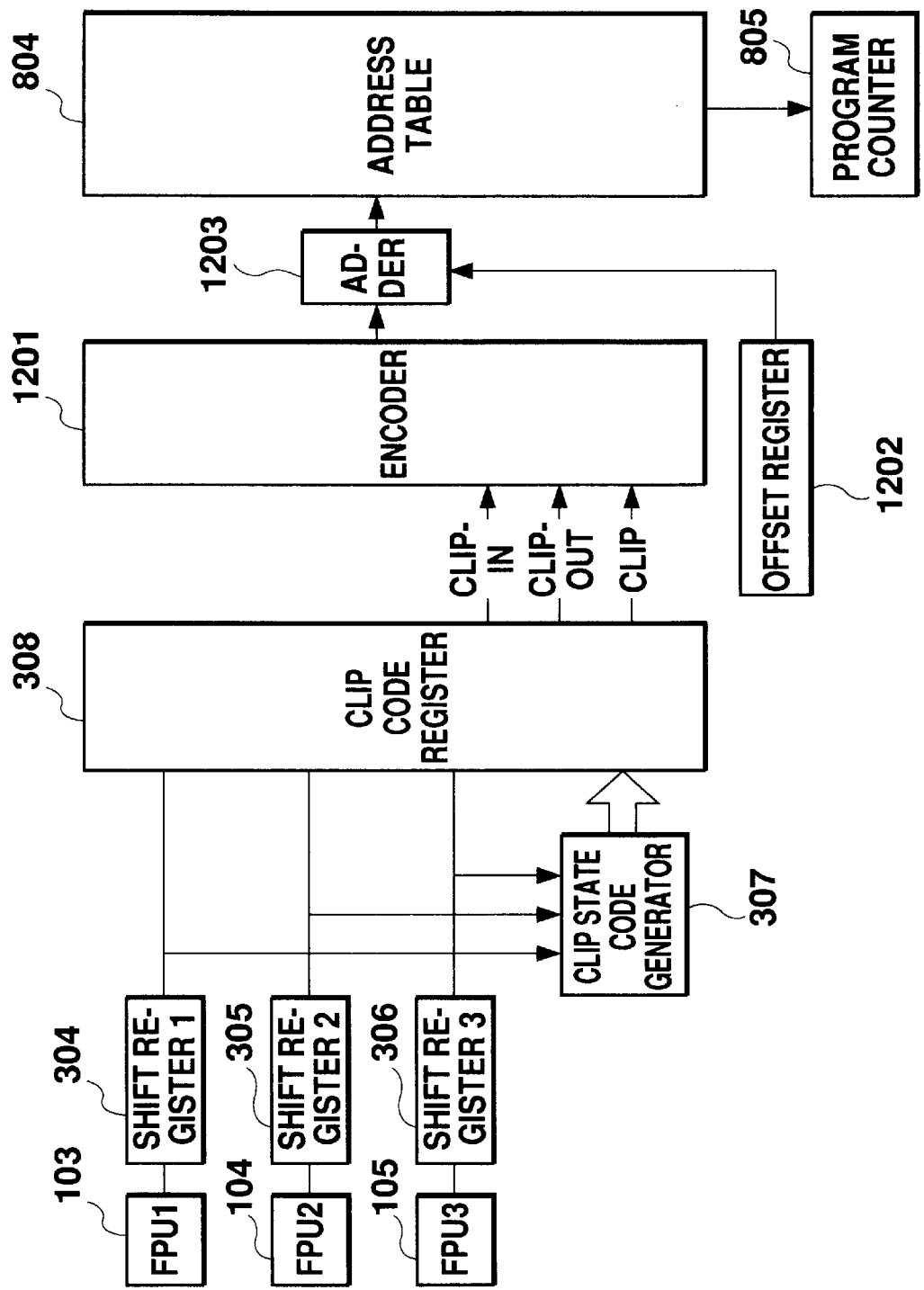
FIG. 16 is a block diagram showing the construction of a program counter controller according to a seventh preferred embodiment of the present invention.

A seventh preferred embodiment of the present invention will next be described. FIG. 16 is a block diagram showing the construction of a program counter controller of the seventh embodiment, including FPU1-103, FPU2-104, FPU3-105, shift registers 1-304, 2-305, 3-306, a clip state code generator 307, a clip code register 308, an encoder 1201, an offset register 1202, an adder 1203, an address table 804, and a program counter 805.

The basic operation is the combination of those of the second and fifth embodiments, in which a condition branch can jump to other locations depending on the content of the clip code register 308. An example will be taken in which a clip judgement is made for a triangular object. FPU1-103, FPU2-104, and FPU3-105 generate clip codes for three vertices, and supply the clip codes via the shift registers 304, 305, and 306 to the clip state code generator 307. The clip state code generator 307 executes logical operations so as to generate a clip state code, which is then supplied to the clip code register 308 and stored therein. The register bits held in the clip code register 308, which indicate clip-in, clip-out, and clip states of an object, are supplied to the encoder 1201, similar to that in the fifth embodiment. The adder 1203 adds the encoded result and the data in the offset register 1202. Based on the added result, the address table 804 is accessed, so that data is retrieved therefrom and registered in the program counter 805. The offset register 1202 contains an address where a clip process routine for every object (a triangular object, a straight line etc.) is stored.

As described above, according to the seventh preferred embodiment, it is possible to make a clip code judgement and to jump to a clip process routine using hardware, which allows high speed clip judgement.

[Embodiment 8]

Figure 17:
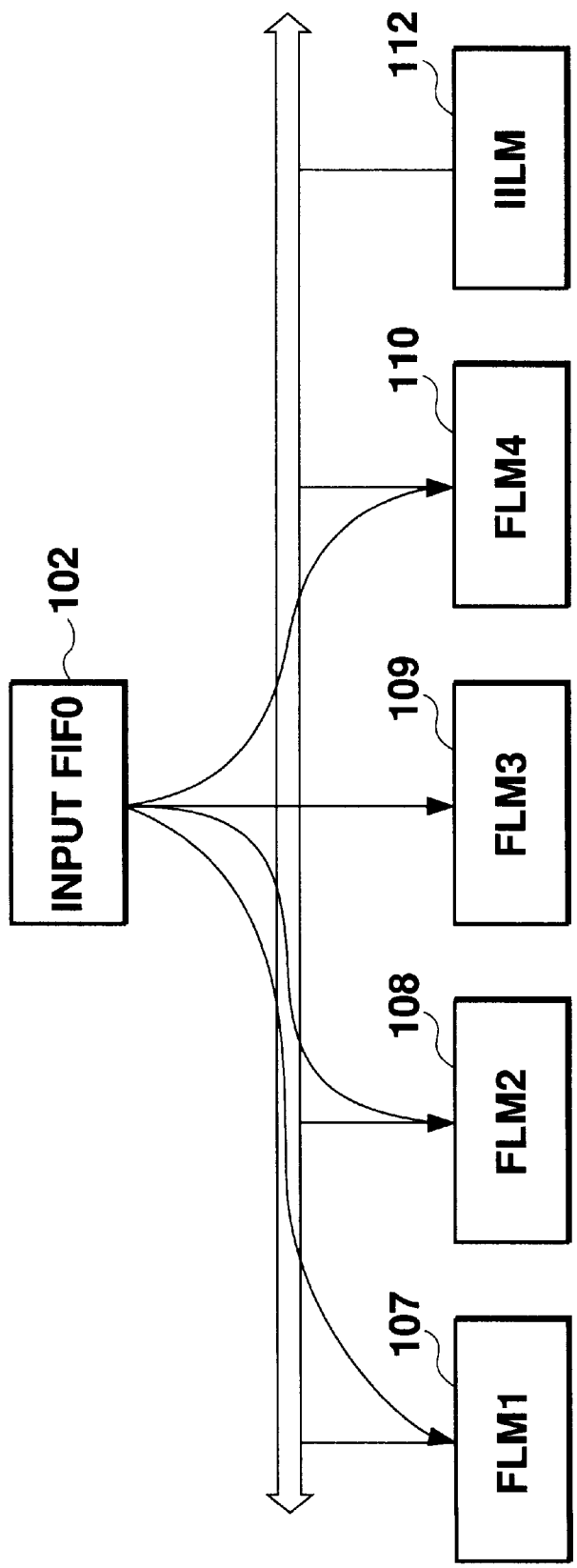
FIG. 17 is a diagram used for an explanation about a geometrical operation apparatus according to an eighth preferred embodiment of the present invention.

An eighth preferred embodiment of the present invention will next be described. FIG. 17 is a block diagram showing local memories FLM1-107, FLM2-108, FLM3-109, FLM4-110, ILM-112 and an input FIFO 102 of a geometrical operation apparatus which comprises four floating processing units and one integer type processing unit. When data from a host computer is supplied from the input FIFO 102 to the respective FLM1-4, the sequencer (shown in FIG. 1) decodes a multicast transmission instruction and instructs to conduct a multicast transmission, wherein data is sent from one source to a plurality of destinations simultaneously. As a result, data is transmitted to four memories simultaneously during one cycle.

In order to achieve a multicast transmission, a transmission instruction is defined, for instance, as shown in FIG. 18, including a source field for indicating a transmission source itself and a destination field for indicating a transmission destination itself in addition to an instruction field, a source address for indicating the address of the transmission source and a destination address for indicating the address of the transmission destination. The two added fields may be provided with an inner register ILM-112, and multicasts FLM, FLM1-107, FLM2-108, FLM3-109, and FLM4-110, etc. For instance, in the case where the source field is provided with FLM1-107 and the destination field is provided with a multicast FLM, it is possible to conduct a multicast transmission from FLM1-107 to FLM1-4.

As described above, according to this embodiment, a multicast transmission ensures effective data transmission between processors capable of parallel processing.

[Embodiment 9]

Figure 20:
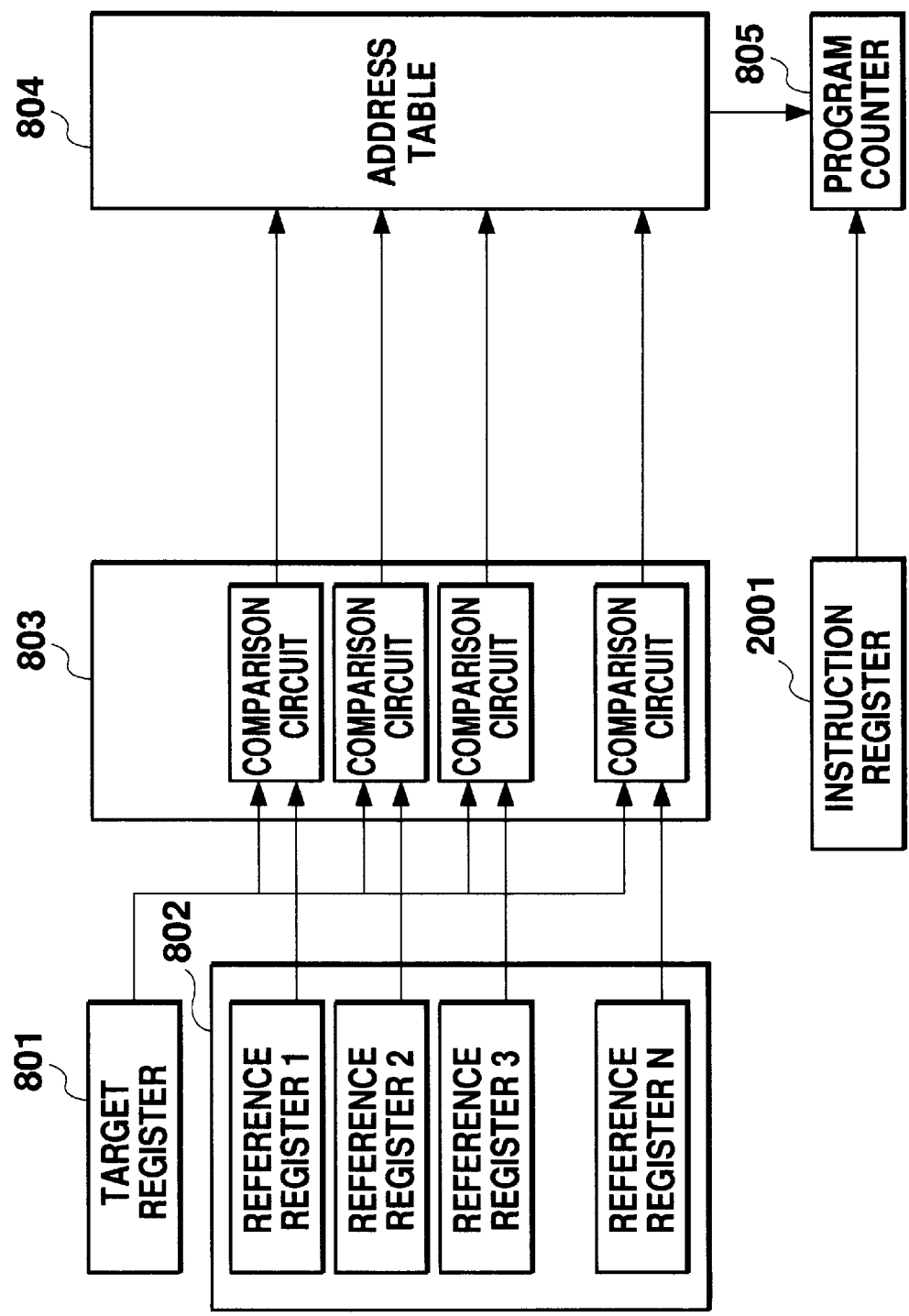
FIG. 20 is a block diagram showing the construction of a program counter controller according to a ninth embodiment of the present invention.
Figure 21:
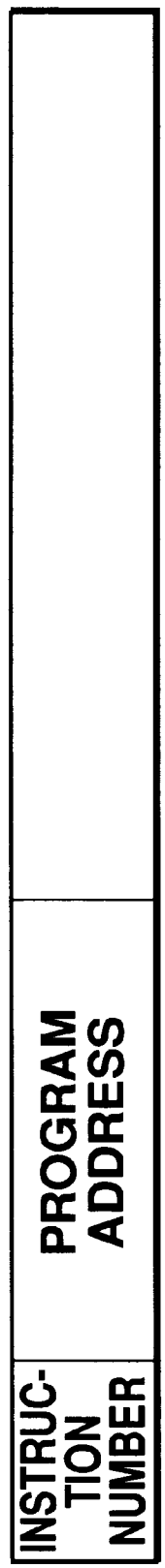
FIG. 21 is an example of a field code shown in the ninth embodiment.

A ninth preferred embodiment of the present invention will be described. FIG. 20 shows a program counter controller of the geometrical operation apparatus of the third embodiment which is further provided with an instruction register 2001. A control instruction of the geometrical operation apparatus, which is supplied by a host computer, includes an instruction ID number for identifying instructions. According to this embodiment, the control instruction further includes an address of an instruction memory which holds a program corresponding to the instruction. As shown in FIG. 21, a code format (instruction data) of the control instruction is provided with a field for containing a program address.

The operation will be described with reference to FIG. 20. A host computer inputs an instruction which is supplied to an instruction register 2001, where it is detected whether the instruction requires a condition branch described in the third embodiment. If it does not, the program address contained in the instruction data is directly registered in the program counter 805, so that the operational process jumps to a program designated by the instruction.

As described above, it is possible to execute a program at a higher speed than executing a program after decoding an instruction ID.

[Embodiment 10]

Figure 22:
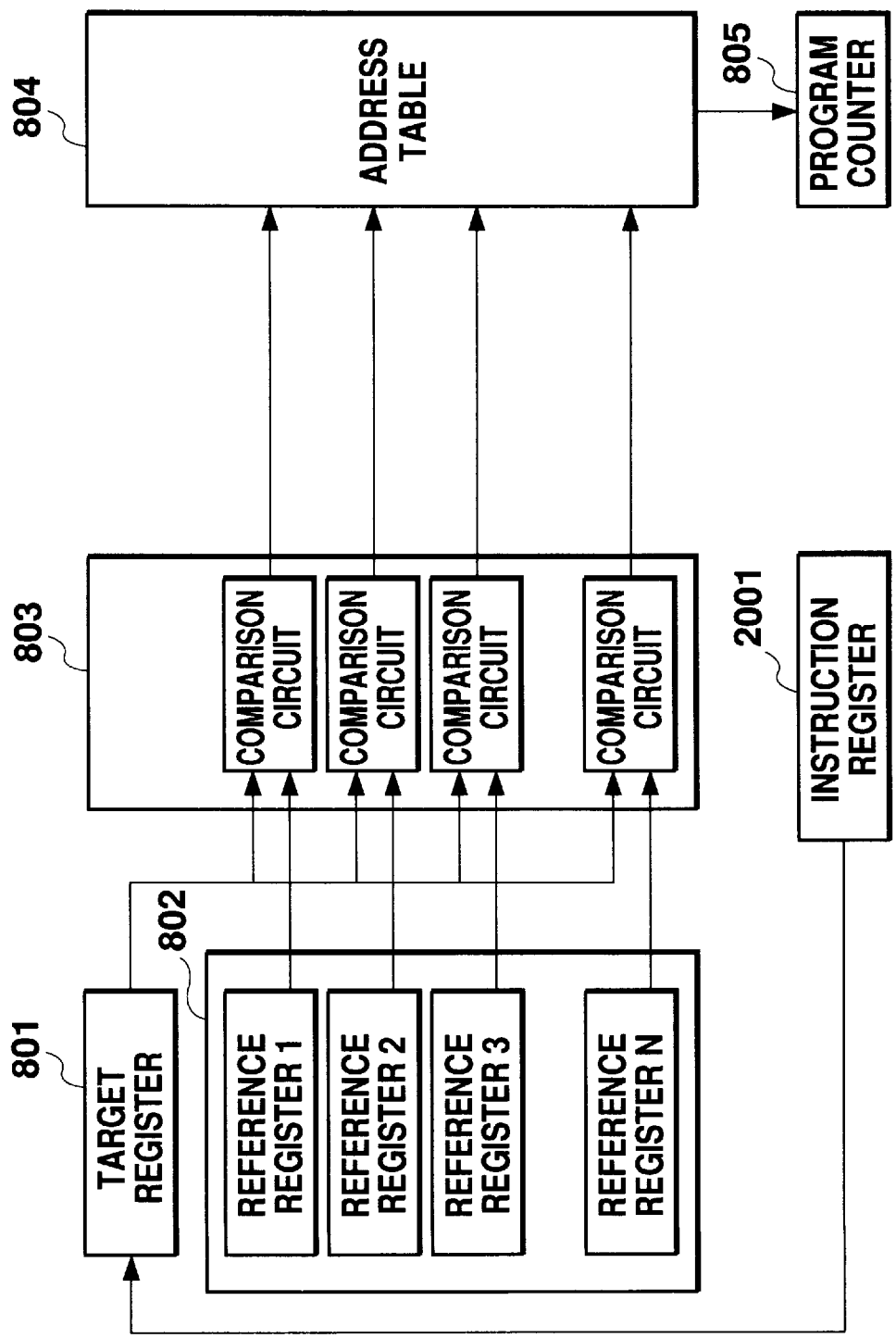
FIG. 22 is a block diagram showing a construction of a program counter controller according to a tenth preferred embodiment.
Figure 23:
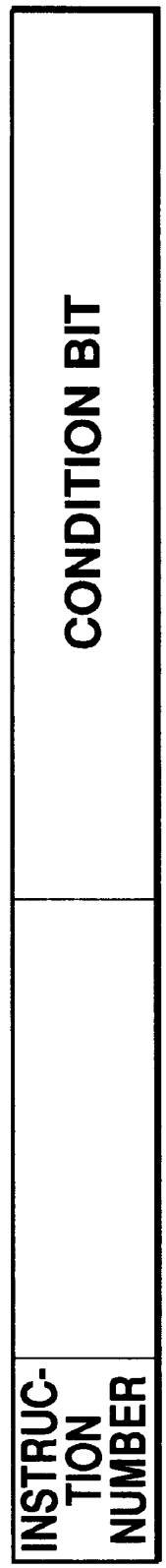
FIG. 23 is an example of an instruction field shown in the tenth preferred embodiment.
Figure 24:
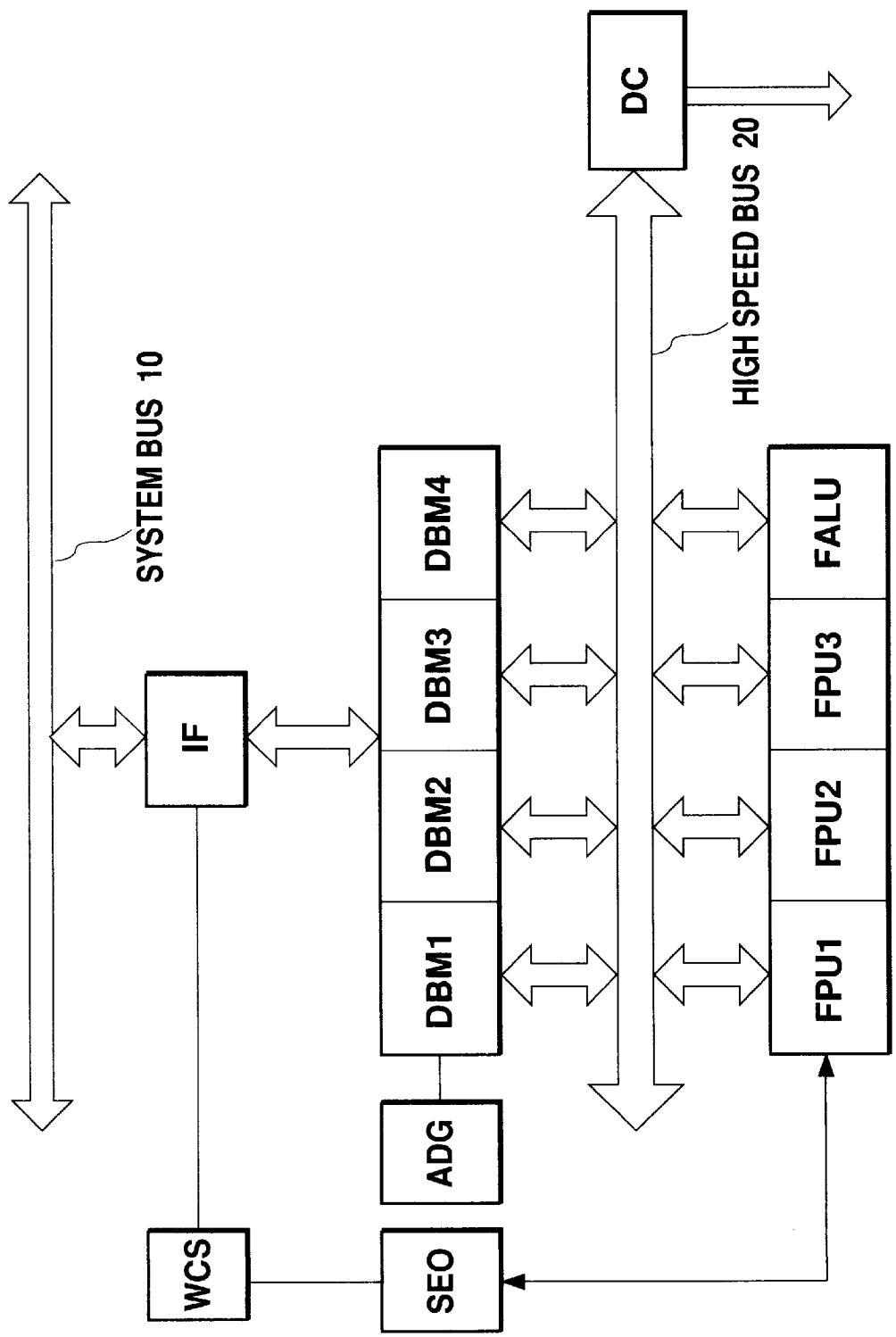
FIG. 24 is a block diagram showing a conventional 3-D image generation apparatus.

A tenth preferred embodiment will next be described. FIG. 22 shows a program counter controller of the geometrical operation apparatus of the third embodiment which is further provided with an instruction register 2001. A control instruction for the geometrical operation apparatus, which is supplied by a host computer, includes an instruction ID number for identifying instructions. According to this embodiment, the control instruction further includes data about a branch condition to be set in the target register 801 when making a condition branch. As shown in FIG. 23, a code format (instruction data) in the control instruction is provided with a field for containing condition bits.

The operation will be described with reference to FIG. 22. A host computer inputs an instruction which is supplied to an instruction register 2001, where it is detected whether the instruction requires a condition branch described in the third embodiment. If it does, the data in the condition bit field is supplied to the target register 801.

As described above, it is unnecessary to input an instruction to a target register 801 for setting a condition bit before executing an instruction which requires a condition branch described in the third embodiment. As a result, a high speed condition branch can be achieved.

What is claimed is:

1. A geometrical operation apparatus, comprising:
   an input memory for storing data necessary for various geometrical operations;
   a global bus connected to the input memory;
   a plurality of floating process memories connected to the global bus, to which the data necessary for various geometrical operations are transmitted;
   a sequencer for transmitting the data stored in the input memory to the plurality of floating process memories;
   a plurality of floating processing units each connected to a respective one of the plurality of floating process memories, for independently performing various geometrical operations using the data transmitted to the floating process memories;
   a plurality of shift registers each connected to a respective one of the plurality of floating processing units, for storing a clip code in a shiftable way, the clip code being produced as a result of a clipping operation by the corresponding floating processing unit;
   a clip state code generator for generating a clip state code indicating a state of an object consisting of a plurality of vertices, using clip codes stored in the plurality of shift registers; and
   a clip code register for storing the clip code shifted by the plurality of shift registers and a clip state code generated by the clip state code generator.

2. A geometrical operation apparatus according to claim 1, wherein
   the sequencer conducts data transmission between the plurality of floating process memories, using a transmission instruction,
   the transmission instruction including
      a source field for indicating a source of the data transmission,
      a destination field for indicating a destination of the data transmission, and
      a bit field provided to the source field and the destination field, for indicating any or all the plurality of floating process memories.

3. A geometrical operation apparatus, comprising:
   a target register for storing a present true/false state of conditions, which is referred to when performing a branch operation in a geometrical operation;
   a plurality of reference registers each for storing predetermined true/false state of the conditions;
   an address table for holding addresses of process programs each corresponding to a respective one of the plurality of the reference registers;
   a comparator for comparing the target register with each of the plurality of reference registers, so as to output a comparison result; and
   a program counter controller for executing a process program having the address identified in the address table by the comparison result.

4. A geometrical operation apparatus according to claim 3, further comprising:
   a mask register for storing mask information which specifics register bits which are to be neglected by the comparator.

5. A geometrical operation apparatus according to claim 3, further comprising:
   an instruction register for storing instruction data which includes a field for identifying an instruction and a field for holding an address of a process program corresponding to the instruction, wherein
      the program counter controller executes the process program stored at the address held in the instruction register.

6. A geometrical operation apparatus according to claim 5, wherein
   the instruction data includes a field for holding a branch condition which is stored in the target register.

7. A geometrical operation apparatus according to claim 3, wherein said comparator outputs a comparison result for each of said plurality of reference registers and said program connector controller executes a process program having the address identified in the address table based on the comparison results.

8. A geometrical operation apparatus according to claim 7, wherein said program counter controller executes a process program leaving the address identified in the address table at a location identified by the comparison result which indicates matching data between the corresponding reference register and the target register.

9. A geometrical operation apparatus comprising:
   a target register for storing a present true/false state of conditions, which is referred to when performing a branch operation in a geometrical operation;
   a plurality of reference registers each for storing predetermined true/false state of the conditions;
   an address table for holding addresses of process programs each corresponding to a respective one of the plurality of the reference registers;
   a comparator for comparing the target register with each of the plurality of reference registers, so as to output a comparison result;
   a program counter controller for executing a process program having the address identified in the address table, on the basis of the comparison result;
   an encoder for encoding the comparison result, so as to generate a pointer indicating a location where the process program is held;
   an offset register for storing an offset value accompanying the pointer generated by the encoder; and
   an adder for adding the pointer value generated by the encoder and the offset value stored in the offset register.

10. A geometrical operation apparatus according to claim 9, further comprising:
    a plurality of floating process memories for storing data necessary for various geometrical operations;

a plurality of floating processing units each connected to a respective one of the plurality of floating process memories, for independently performing various geometrical operations using data stored in respective floating process memories;

a plurality of shift registers each connected to a respective one of the plurality of floating processing units, for storing a clip code in a shiftable way, the clip code being generated as a result of a clip operation by the corresponding floating processing unit;

a clip state code generator for generating a clip state code indicating a state of an object consisted of a plurality of vertices, using clip codes stored in the plurality of shift registers; and a clip code register for storing the clip code shifted by the plurality of shift registers and the clip state code generated by the clip state code generator.

* * * * *